(12) United States Patent
Odagiri et al.

(10) Patent No.: US 8,045,814 B2
(45) Date of Patent: Oct. 25, 2011

(54) IMAGE COMPRESSION DEVICE, COMPRESSING METHOD, STORAGE MEDIUM, IMAGE DECOMPRESSION DEVICE, DECOMPRESSING METHOD, AND STORAGE MEDIUM

(75) Inventors: Junichi Odagiri, Kawasaki (JP); Hironori Yahagi, Kawasaki (JP); Shigeru Yoshida, Gamagori (JP)

(73) Assignee: Fujitsu Limited, Kawasaki (JP)

( * ) Notice: Subject to any disclaimer, the term of this patent is extended or adjusted under 35 U.S.C. 154(b) by 520 days.

(21) Appl. No.: 12/268,057

(22) Filed: Nov. 10, 2008

(65) Prior Publication Data

US 2009/0052790 A1    Feb. 26, 2009

Related U.S. Application Data

(63) Continuation of application No. PCT/JP2006/316107, filed on Aug. 16, 2006.

(30) Foreign Application Priority Data

May 17, 2006    (JP) ................................ 2006-138071

(51) Int. Cl.
*G06K 9/46* (2006.01)
(52) U.S. Cl. ................. 382/238; 382/232; 382/236
(58) Field of Classification Search .................. 382/232, 382/236, 238, 239, 251; 348/441, 443, 452; 375/E7.139, E7.155; 362/236, 261
See application file for complete search history.

(56) References Cited

U.S. PATENT DOCUMENTS

| 4,386,366 A | 5/1983 | Mori | 348/420.1 |
| 4,613,948 A | 9/1986 | Gharavi | 382/162 |
| 4,636,856 A | 1/1987 | Starck | 375/240.12 |
| 4,725,885 A | 2/1988 | Gonzales et al. | 375/240.14 |
| 4,864,397 A | 9/1989 | Zehner et al. | 375/240.14 |
| 2001/0043754 A1 | 11/2001 | Memon et al. | 382/251 |

FOREIGN PATENT DOCUMENTS

| DE | 3714130 | 11/1988 |
| JP | 56-136093 | 10/1981 |
| JP | A 6-350992 | 12/1994 |
| JP | 2573921 | 10/1996 |
| JP | A 10-126777 | 5/1998 |
| JP | A 2000-59782 | 2/2000 |

(Continued)

OTHER PUBLICATIONS

Hans Georg Musmann, et al., "Advances in Picture Coding," Proceedings of the IEEE, vol. 73, No. 4, pp. 523-548, Apr. 1985.

(Continued)

*Primary Examiner* — Anh Hong Do
(74) *Attorney, Agent, or Firm* — Greer, Burns & Crain Ltd.

(57) ABSTRACT

An image compression device having a prediction unit for predicting a value of a compressing target pixel from peripheral values, and quantizing prediction error between a prediction value of the prediction unit and a value of an actual pixel in a predetermined quantizing step, comprising: a specific pixel level difference evaluation unit sequentially calculating the difference value between the level values as a sum of the prediction values corresponding to each of the compressed pixel immediately before the compressing target pixel and peripheral compressed pixels adjacent to the pixel and the quantization value of the prediction error, and evaluating the sameness of the difference value; and a quantization switching unit controlling the quantization in the quantizing step more precise than the quantizing step used when the difference value continuously indicates the same value as a result of the evaluation by the specific pixel level difference evaluation unit.

18 Claims, 18 Drawing Sheets

FOREIGN PATENT DOCUMENTS

WO      WO 91/18479      11/1991

OTHER PUBLICATIONS

European Search Report issued in EP 06 79 6466, dated Nov. 23, 2010.

Schobinger et al.; "Single-chip Adaptive DPCM Video Codec;" IEEE Journal of Solid-State Circuits, IEEE Service Center, Piscataway, NJ; vol. 24, No. 4; Aug. 1, 1989.

Jianmin Jiang; "A low-Cost Content-Adaptive and Rate-Controllable Near-Lossless Image Codec in DPCM Domain;" IEEE Transactions on Image Processing; IEEE Service Center, Piscataway, NJ; vol. 9, No. 4; Apr. 1, 2000.

Ortega et al.; "Adaptive Quantization Without Side Information;" Proceedings of the International Conference on Image Processing (ICIP); Austin Nov. 13-16; 1994; [Proceedings of the International Conference on Image Processing (ICIP)], Los Alamitos, IEEE Comp. Soc. Press, US; vol. 3, Nov. 13, 1994.

Notice of Rejection Grounds issued in Japanese App. No. 2008-515425, mailed Jan. 11, 2011 (with partial English translation).

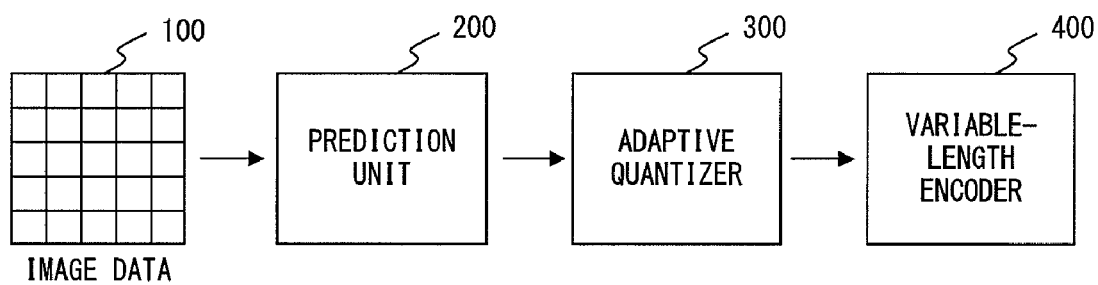
F I G. 3

| PREDICTION ERROR | QUANTIZATION PREDICTION ERROR | QUANTIZATION NUMBER |
|---|---|---|
| -11~ | -15 | 7 |
| -4~-10 | -6 | 5 |
| -1~-3 | -1 | 3 |
| 0 | 0 | 1 |
| 1~3 | 1 | 2 |
| 4~10 | 6 | 4 |
| 11~ | 15 | 6 |

FIG. 6A

| PREDICTION ERROR | QUANTIZATION PREDICTION ERROR | QUANTIZATION NUMBER |
|---|---|---|
| -21~ | -28 | 7 |
| -8~-20 | -12 | 5 |
| -3~-7 | -4 | 3 |
| -2~2 | 0 | 1 |
| 3~7 | 4 | 2 |
| 8~20 | 12 | 4 |
| 21~ | 28 | 6 |

FIG. 6B

| PREDICTION ERROR | QUANTIZATION PREDICTION ERROR | QUANTIZATION NUMBER |
|---|---|---|
| -41~ | -58 | 7 |
| -15~-40 | -24 | 5 |
| -5~-14 | -8 | 3 |
| -4~4 | 0 | 1 |
| 5~14 | 8 | 2 |
| 15~40 | 24 | 4 |
| 41~ | 58 | 6 |

FIG. 6C

| QUANTIZATION NUMBER | QUANTIZATION PREDICTION ERROR |
|---|---|
| 7 | -15 |
| 5 | -6 |
| 3 | -1 |
| 1 | 0 |
| 2 | 1 |
| 4 | 6 |
| 6 | 15 |

FIG. 12A

| QUANTIZATION NUMBER | QUANTIZATION PREDICTION ERROR |
|---|---|
| 7 | -28 |
| 5 | -12 |
| 3 | -4 |
| 1 | 0 |
| 2 | 4 |
| 4 | 12 |
| 6 | 28 |

FIG. 12B

| QUANTIZATION NUMBER | QUANTIZATION PREDICTION ERROR |
|---|---|
| 7 | -58 |
| 5 | -24 |
| 3 | -8 |
| 1 | 0 |
| 2 | 8 |
| 4 | 24 |
| 6 | 58 |

FIG. 12C

IMAGE COMPRESSION DEVICE, COMPRESSING METHOD, STORAGE MEDIUM, IMAGE DECOMPRESSION DEVICE, DECOMPRESSING METHOD, AND STORAGE MEDIUM

CROSS REFERENCE TO RELATED APPLICATION

This application is a continuation of PCT application PCT/JP2006/316107 filed on Aug. 16, 2006.

BACKGROUND OF THE INVENTION

1. Field of the Invention

The present invention relates to an image compression device, a compressing method, and a program capable of realizing two types (natural images such as movies etc. and CG images such as a digital map etc.) of high quality images having different characteristics in real time, and an image decompression device, a decompressing method, and a program capable of decompressing compressed image data.

2. Description of the Related Art

It is necessary to compress data to transmit image information containing an large amount of information. Especially, since 30 through 60 frames of image data are transmitted and received for moving pictures, the data compression is required.

It is well known that image information can be natural images such as general television images, movies, etc. and CG images represented by maps for car navigation etc. Generally, natural images contains a number of low-frequency components, and digital images contains a number of high-frequency components. In a recent mobile terminal such as a car-mounted terminal, a mobile telephone, etc., both digital images such as a map etc. and natural images such as TV and movie pictures etc. are processed. To efficiently transmit both types of image data, an effective data compressing system for both low-frequency components and high-frequency components is desired.

The first conventional technology using a DPCM prediction device shown in FIG. 1 is knows as a common conventional image data compressing system. As shown in FIG. 1, when image data 110 is compressed, a prediction unit (DPCM) 210 predicts a value of a pixel to be predicted from the line preceding a target pixel and the value of a preceding pixel, converts a prediction error from an actual pixel level value into a representative value, quantizes the value using a quantizer 310, and transmits a quantized value through a variable-length encoder 410 for assigning a code depending on the frequency of occurrence. In this system, both high-frequency components and low-frequency components can be processed in a pixel unit for quantization and encoding. However, since a prediction value is calculated on the basis of the value of the preceding line, an error is used during the next predicting process if the error occurs at any point. As a result, the prediction error propagates and causes image degradation along the line.

For example, when a quantization table used by the quantizer 310 has the prediction error value of −4 through 4 as a quantization prediction error of 0 (that is, a quantization table having a rough quantization width), the quantization prediction error is assumed as 0 although a prediction error of the value of −4 through 4 occurs in any predicting process by the prediction unit (DPCM) 210. Therefore, the information that the prediction error has occurred cannot be included in the quantization result, and the prediction error remains as is. If the propagation of the prediction error occurs, a line unexpectedly occurs in the direction of the line in an image output as a process result, thereby causing image degradation.

Additionally, as a conventional image data compressing system, the second conventional technology of compressing data by a JPEG (joint photographic experts group) and a MPEG (moving picture experts group) as shown in FIG. 2 is well known. The following patent documents 1 and 2 belong to the second conventional technology. As shown in FIG. 2, the second conventional technology divides an input image 120 into blocks (normally 8*8 pixels) 130, applies DCT 220 to the block image, performs quantization 320 on a DCT coefficient, performs variable-length encoding 420 for assigning a code depending on the frequency of occurrence, and transmit the result. A DCT (discrete cosine transfer) is a method for applying frequency transform to an image data. Since human eyes are sensitive to low-frequency components (flat portion in an image), the DCT coefficient for a low frequency is precisely quantized, and the DCT coefficient for a high frequency is roughly quantized, thereby compressing natural images at a high compression rate at which image degradation can be inconspicuous. However, there is no problem with the compression of natural images when conspicuous low-frequency components are precisely quantized, but the image degradation is conspicuous on the high-frequency components such as a line and a character in map images (CG images). Furthermore, since edge information extraction 230 is performed on a block to be compressed, there is the problem that correction and feedback cannot be performed by detecting the image degradation caused by a quantization error.

Furthermore, although not shown in the attached drawings, the third conventional technology using a JPEG-LS (lossless) is known as a conventional image data compressing system. The third conventional technology predicts a value by a MED prediction device (Median edge detector), and directly encodes a prediction error. There is no image degradation because quantization is not performed in the third conventional technology. However, each process is heavy because, for example, a calculating process is required in encoding. Therefore the third conventional technology is unsuitable for real-time compression.

If the quantization is simply performed using the DPCM as the above-mentioned first conventional technology, there occurs the problem that a quantization error propagates in the direction of the line. In addition, in the transfer and encoding using a DCT such as the JPEG, the MPEG, etc. as the above-mentioned second conventional technology, there occurs the problem that image degradation is conspicuous on CG images, and there also occurs the problem that although adaptive quantization is performed, no correction or feedback can be performed by detecting image degradation by a quantization error because an edge is extracted from a compressing target block. Furthermore, in the JPEG-LS as the above-mentioned third conventional technology, quantization is not performed and therefore no image degradation occurs, but each process is heavy and is not appropriate for real-time processing.

Patent Document 1: Japanese Published Patent Application No. H10-126777

Patent Document 2: Japanese Published Patent Application No. H6-350992

SUMMARY OF THE INVENTION

The present invention aims at provide an image compression device, method, and program capable of suppressing the image degradation between the lines caused by the quantization error when quantization tables are switched with the continuity of a prediction level value between a peripheral pixel and a line taken into account, and a image decompression device, method, and program capable of decompressing compressed image data.

The image compression device according to the present invention includes a prediction unit for predicting a value of a compressing target pixel from the peripheral values relative to the compressing target pixel, and quantizes the prediction error between the prediction value of the prediction unit and the value of an actual pixel in a quantizing step. The device includes: a specific pixel level difference evaluation unit for sequentially calculating the difference value between the level values as a sum of the prediction values corresponding to each of the compressed pixel immediately before the compressing target pixel and the adjacent compressed pixels around the pixel and the quantization value of the prediction error, and evaluating the sameness of the difference value; and a quantization switching unit for controlling the quantization in the quantizing step more precise than the quantizing step used when the difference value continuously indicates the same value as a result of the evaluation by the specific pixel level difference evaluation device.

Thus, it is determined in a pixel unit whether or not image degradation has occurred during the quantization process, and the result is immediately fed back to quantization and encoding processes, thereby immediately (in several pixel units) correcting the image degradation if it has occurred.

When a quantization error occurs, the same level differences for a quantizing step occur in many cases between lines. Therefore, the continuity of the same difference values is evaluated, and if it is determined that a quantization error has propagated, the information is immediately fed back to perform precise quantization, thereby preventing the propagation of a prediction error easily occurring toward the flat area on the screen from the vicinity of the edges especially in CG images.

In addition, by calculating the sum of the absolute values of the difference value as the activity level of the pixels in the preceding line and line to be currently processed, and making more precise or rough quantizing steps depending on the sum, the compression efficiency can be enhanced with the image degradation suppressed.

The image decompression device and the image decompressing method according to the present invention decompress image data compressed by the image compression device in the reverse operation. That is, it is evaluated in a pixel unit whether or not error propagation occurs during an inverse-quantizing process, and immediately feeding back the evaluation result to the inverse-quantization and inverse encoding for the next pixel, thereby switching the quantization tables with the same timing as the compressing process.

In addition, by calculating the sum of the absolute values of the level differences as the activity level of the pixels in the preceding line and line to be currently processed, the quantizing step can be roughly or precisely set with the same timing as the compressing process.

A program for directing a computer to perform the present invention, a storage medium storing the program, and a method for realizing the present invention by the computer are included in the present invention.

BRIEF DESCRIPTION OF THE DRAWINGS

FIG. 3 is a flowchart of the operation of the image compressing system according to the principle of the present invention;

FIG. 6A is a quantization table showing the correspondence between a prediction error quantization value and a quantization number for a prediction error (X-X'), and a first quantization table including precise quantizing steps;

FIG. 6B is a quantization table showing the correspondence between a prediction error quantization value and a quantization number for a prediction error (X-X'), and a second quantization table including normal quantizing steps;

FIG. 6C is a quantization table showing the correspondence between a quantization value and a quantization number for a prediction error (X-X'), and a third quantization table including rough quantizing steps;

FIG. 12A is an inverse-quantization table showing the correspondence of the quantization prediction error to the quantization number provided for the inverse-quantizer, and the first inverse quantization table including precise quantizing steps;

FIG. 12B is an inverse-quantization table showing the correspondence of the prediction error quantization value to the quantization number provided for the inverse-quantizer, and the second inverse quantization table including normal quantizing steps;

FIG. 12C is an inverse-quantization table showing the correspondence of the prediction error quantization value to the quantization number provided for the inverse-quantizer, and the third inverse quantization table including rough quantizing steps;

DESCRIPTION OF THE PREFERRED EMBODIMENTS

The embodiments of the present invention are described below with reference to the attached drawings.

FIG. 3 is a flowchart of the operation of the image compressing system according to the principle of the present invention. The outstanding difference of the image compression process in the configuration showing the principle of the present invention from the first conventional technology is that an adaptive quantizer 300 is provided, and when the quantizer quantizes the prediction error between the value of a pixel to be predicted X and the prediction value X' by a prediction unit 200, the adaptive quantizer 300 adaptively selects a quantization table having a different quantizing step based on the continuity of the difference value of the level value (sum of a prediction value and a prediction error quantization value) of a target pixel between the lines or the sum of the differences between the level values of the peripheral pixels. Then, the quantization is performed on the basis of the adaptively selected quantization table, and the result is transmitted through a variable-length encoder 400 for assigning a code depending on the frequency of occurrence.

Figure 1:
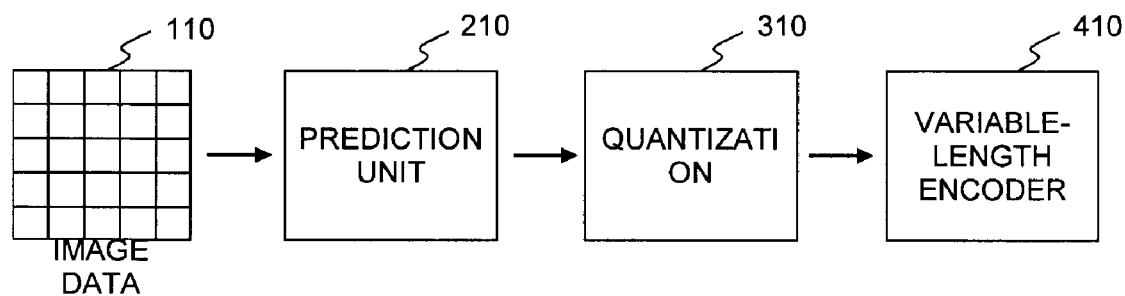
FIG. 1 shows the outline of the first conventional technology using the DPCM prediction device.
Figure 2:
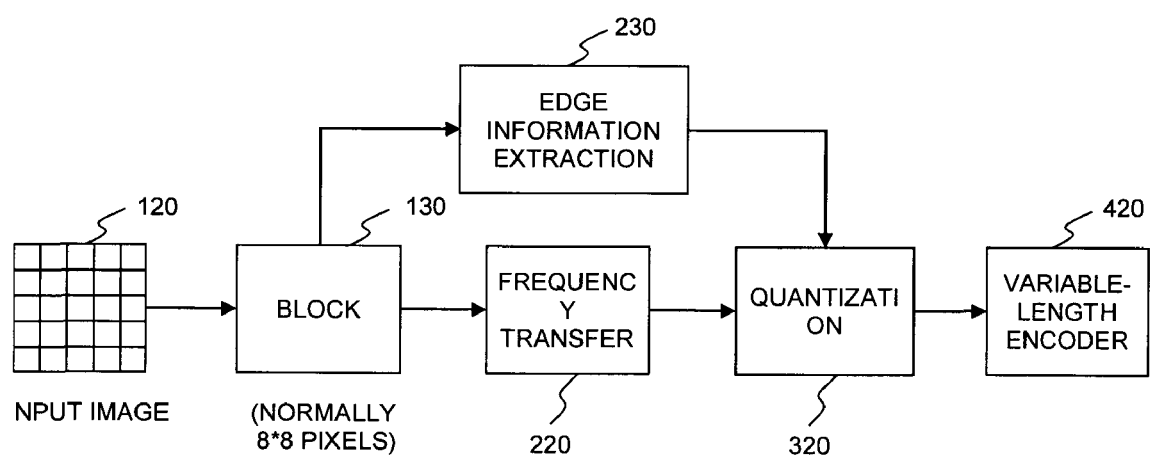
FIG. 2 shows the outline of the second conventional technology for compressing data by the JPEG and the MPEG.
Figure 4:
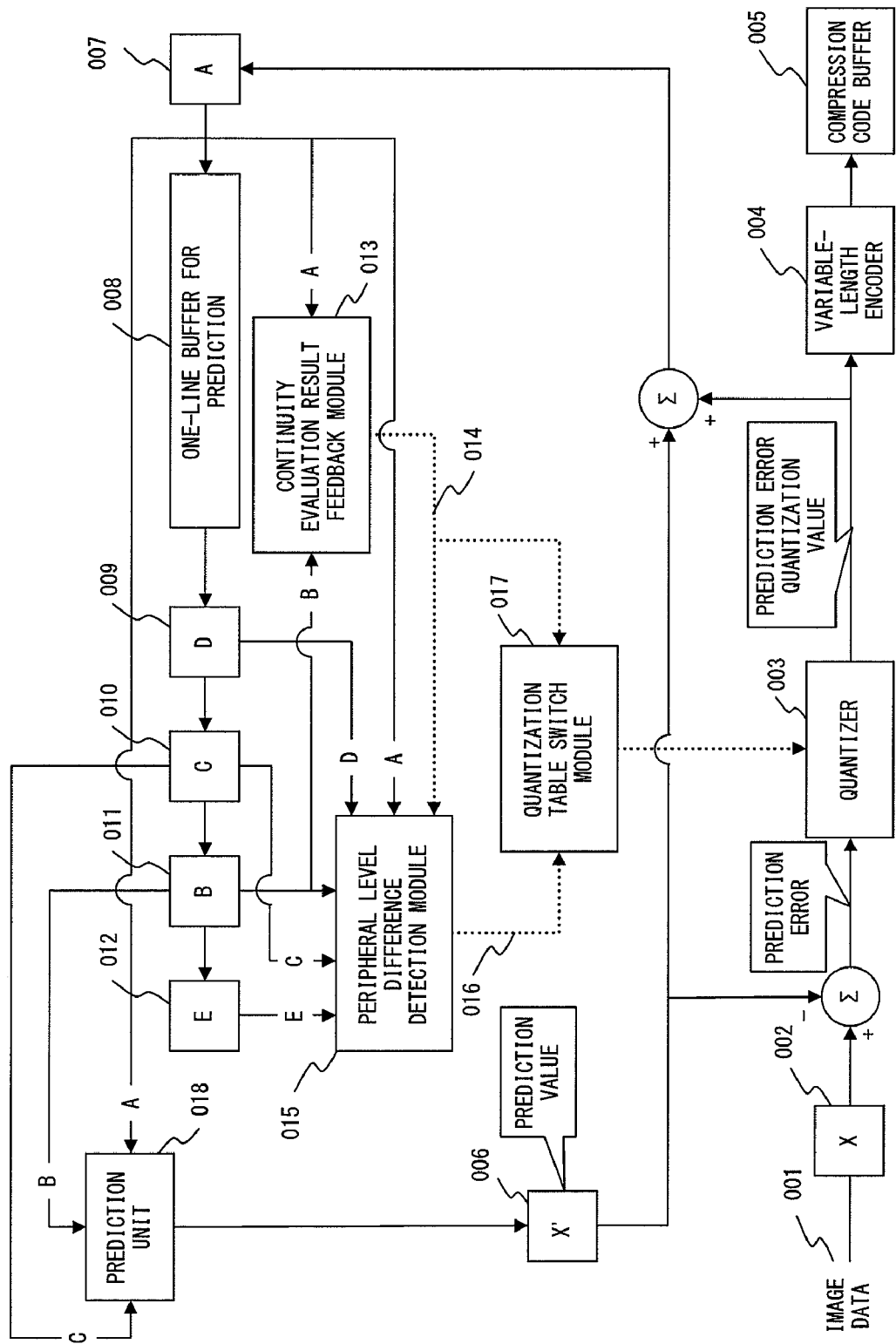
FIG. 4 is a block diagram of the configuration of the image data compression (encoding) device according to an embodiment of the present invention.
Figure 5:
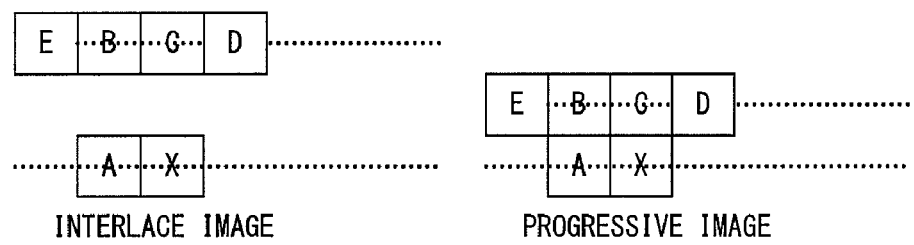
FIG. 5 shows the arrangement of a pixel to be compressed and peripheral pixels in various image formats according to an embodiment of the present invention.

FIG. 4 is a block diagram of the configuration of the image data compression (encoding) device according to an embodiment of the present invention. In FIG. 4, image data 001 indicates a group of pixels to be compressed, and is extracted by an image processing device (not shown in the attached drawings) for digitally processing images. Then, a compressing target pixel X (002) indicates a pixel to be compressed in the current step. FIG. 5 shows the arrangement of a compressing target pixel X and peripheral pixels (between the lines and in the preceding pixel) when the image format is an interlace image or a progressive image. In FIG. 5, the lines are indicated by broken lines.

A quantizer 003 quantizes the "prediction error" as a difference value between the compressing target pixel X (002) and a prediction value X' (006) on the basis of the quantization table selected according to the control signal from a quantization table switch module 017 for selecting a quantization table having a different quantizing step on the basis of the continuity of the level value of the target pixel (pixels A and B) between the lines and the measurement of the peripheral pixel level difference (the sum of the absolute values of the peripheral pixel level differences in this embodiment), and outputs a prediction error quantization value (also referred to simply as a quantization value) and a quantization number using a prediction error (X-X') as input.

FIG. 6A is a quantization table indicating the correspondence between the prediction error (X-X') and the prediction error quantization value and the quantization number, and the first quantization table including precise quantizing steps. FIG. 6B is a quantization table indicating the correspondence between the prediction error (X-X') and the prediction error quantization value and the quantization number, and the second quantization table including normal quantizing steps (wider quantizing step than the step the first quantization table). FIG. 6C is a quantization table indicating the correspondence between the prediction error (X-X') and the prediction error quantization value and the quantization number, and the third quantization table including rough quantizing steps (wider quantizing step than the step of the second quantization table).

In the descriptions above, it is desired that the widths of the quantizing steps are narrower for smaller absolute values of prediction error, and wider for larger absolute values of prediction error for the following reason. Generally, when a prediction error is small, it refers to a flat image which can be easily predicted. On the other hand, when a prediction error is large, it refers to the vicinity of an edge which cannot be easily predicted. If there is an error in a flat portion, it can be easily detected by human eyes. Therefore, when a prediction error is small, the quantization error is reduced by narrowing the step width. It is desired that the minimum step width is 0 through 4.

On the other hand, when the prediction error is large, the step width of quantization is expanded to enhance the compression efficiency. It is desired that the step width is 24 through 32. When the prediction error is large, the frequency of occurrence is basically low, and a large prediction error at the vicinity of an edge is not outstanding in comparison with an error at a flat portion. Therefore, the problem is not so serious although a step width is wide. Thus, the expanded step width for the improvement of compression efficiency requires more precise quantization on the flat portion.

For example, the absolute value of a prediction error is set to the minimum value of 0 and the maximum value of 11 or more in the first quantization table in the precise steps shown in FIG. 6A, the absolute value of a prediction error is set to the minimum value of 2 and the maximum value of 21 or more in the second quantization table in the normal steps shown in FIG. 6B, and the absolute value of a prediction error is set to the minimum value of 4 and the maximum value of 41 or more in the third quantization table in the precise steps shown in FIG. 6C.

The correspondence of the prediction error quantization values and the quantization numbers shown in FIGS. 6A, 6B, and 6C is to be consistent between the compression side and the decompression side. Therefore, the decompression side is provided with the inverse quantization tables (FIGS. 12A, 12B, and 12C) showing the correspondence of the prediction error quantization values and the quantization numbers with reference to FIGS. 6A, 6B, and 6C. They are described later. In the description above, three tables are exemplified, but the present invention is not limited to them, and it is necessary only to provide two or more quantization tables having different quantizing step widths.

In addition, when a complicated pattern (image) having a number of edges is compressed, there is the possibility that a predetermined compression rate cannot be attained. Therefore, when a predetermined compression rate probability cannot be attained and there are a plurality of quantization tables having different quantizing step widths, adaptive quantization of selecting a totally rough quantization table in step width can be performed.

A variable-length encoder 004 receives a quantization number obtained with reference to any of the quantization tables shown in FIGS. 6A, 6B, and 6C as input, and outputs a variable-length code. A compression code buffer 005 accumulates the output of the variable-length encoder 004. The prediction value 006 is calculated by a prediction unit 018.

The peripheral pixel A (007) stores a pixel left to the compressing target pixel X as shown in FIG. 5 (That is, as a value corresponding to the pixel processed immediately before on the same line as the pixel X, a sum of the prediction value for the pixel and a prediction error quantization value as a value obtained by quantizing the difference (prediction error) between the pixel value and the prediction value). A one-line buffer for prediction 008 is configured by a buffer, for example, a shift register, for holding about one line for a quantization result (that is, as a value corresponding to each pixel, a sum of a prediction value and a prediction error quantization value) for prediction.

In addition, a peripheral pixel D (009) stores a sum of a prediction value and a prediction error quantization value for a pixel positioned diagonally right above the compressing target pixel X, that is, one pixel after the compressing target pixel X in column but in the preceding line. A peripheral pixel C (010) stores a sum of a prediction value and a prediction error quantization value for a pixel positioned above the compressing target pixel X, that is, in the same column as the compressing target pixel X but in the preceding line. A peripheral pixel B (011) stores a sum of a prediction value and a prediction error quantization value for a pixel positioned diagonally left above the compressing target pixel X, that is, one pixel before the compressing target pixel X in column but in the preceding line. A peripheral pixel E (012) stores a sum of a prediction value and a prediction error quantization value for a pixel positioned left to the peripheral pixel B (011), that is, positioned two pixels before the compressing target pixel X in column but in the preceding line. In the original image as shown in FIG. 5, each of the peripheral pixels D, C, B, and E is positioned two lines above when the original image is the interlace image, and one line above the compressing target pixel X when the original image is the progressive image.

A continuity evaluation result feedback module 013 measures the level difference (A (007) and B (011)) on the basis of the value stored in the peripheral pixels A (007) and B (011), evaluates the continuity of the difference value, and outputs a control signal 014 to use a precise quantization table (a quantization table shown in FIG. 6A) when the same level differences continue a predetermined number of times or more.

In this process, relating to the frequency for the determination of the evaluation of the continuity of the level difference, the size lower than the image size is preferable because a switch to a precise quantization table is desired before image degradation is conspicuous. For example, in an image having 720 pixels in the horizontal direction, horizontal linear image degradation having a length of 6 pixels can be easily detected by human eyes. Therefore, it is desired that a smaller number is set. In the present embodiment, four pixel units are adopted.

Figure 7:
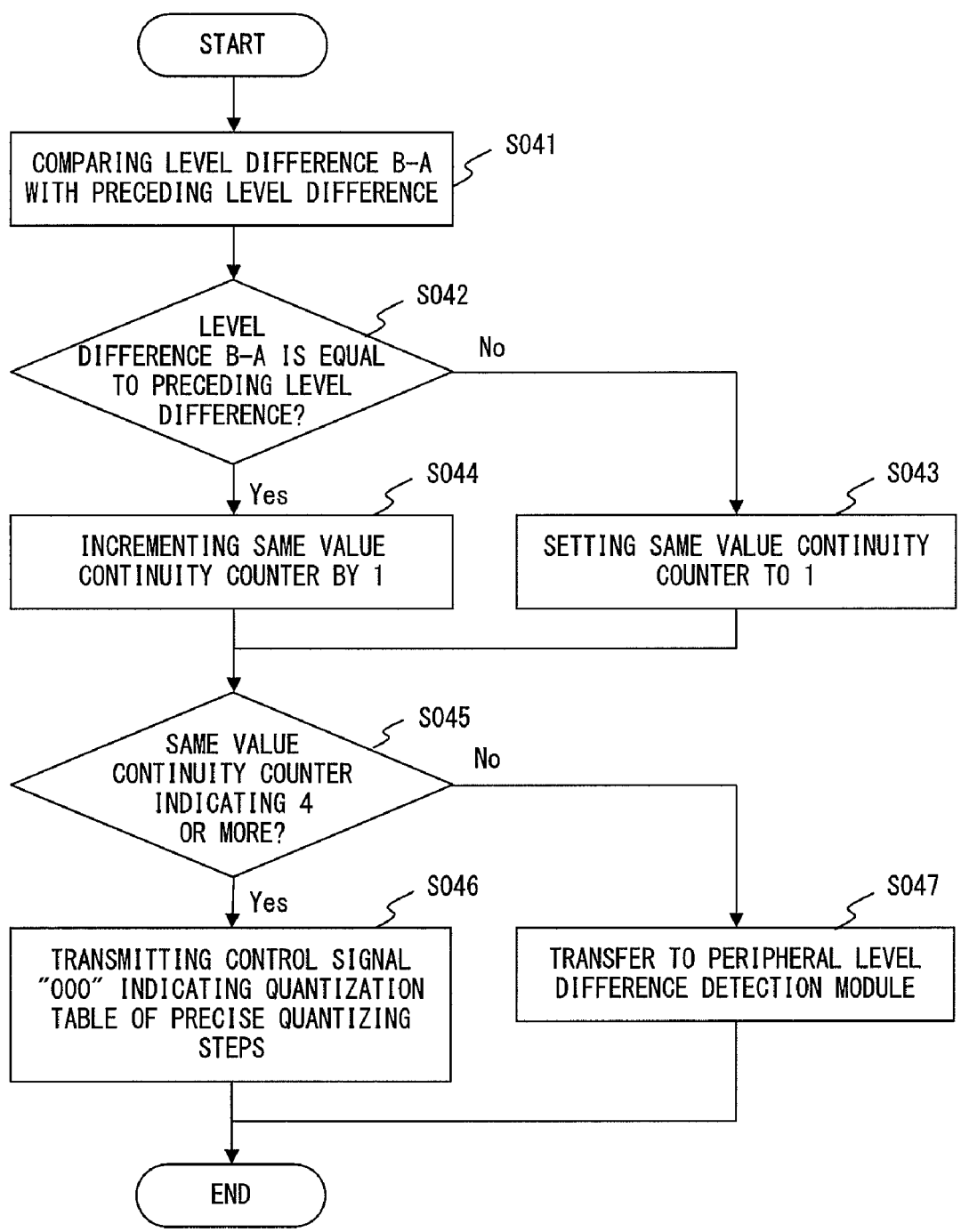
FIG. 7 is a flowchart for explanation of the operation of the continuity evaluation result feedback module shown in FIG. 4.

FIG. 7 is a flowchart of the operation of the continuity evaluation result feedback module 013 shown in FIG. 4. In step S041 shown in FIG. 7, the level difference B-A is compared with the preceding level difference (that is, since it is the level difference corresponding to the level difference B-A when the process immediately before is performed, it corresponds to the level difference between E and the pixel left to the pixel A shown in FIG. 5 in the current process). In step S042, it is determined whether or not the level difference B-A is equal to the preceding level difference. If they are not equal to each other, the same value continuity counter is set to 1 in step S043, and control is passed to step S045. If they are equal to each other, control is passed to step S044, and the same value continuity counter is incremented by 1 in step S044.

In step S045, it is determined whether or not the counter value of the same value continuity counter is 4 or more. If the counter value is 4 or more, control is passed to step S046. In step S046, the control signal "000" indicating the quantization table of precise quantizing steps is transmitted, thereby terminating the process. When the counter value in step S045 is 4 or more, the same level values continues a predetermined number of times or more, and it is considered that the prediction error propagates. Therefore, in this process, the error of the prediction level value can be more precisely detected by switching to a quantization table of more precise quantizing steps. Accordingly, when the prediction error actually propagates, the prediction error can be prevented from further propagating by switching to a quantization table in this process shown in FIG. 7.

If the prediction error is not propagating, and the image to be processed practically indicates the continuity of the same level differences, no problems occur by switching to a more precise quantization table.

In addition, if the counter value is less than 4, control is passed to step S047. In step S047, control is passed to a peripheral level difference detection module 015, thereby terminating the process.

As described above, the control signal 014 indicates the control signal "000" referring to precise quantizing steps, or a control signal referring to the operation of the peripheral level difference detection module 015 for determining which quantization table is to be used again.

The peripheral level difference detection module 015 calculates the absolute value of the sum of the peripheral pixel level differences (difference value of the sum (=level value) of the prediction value corresponding to each pixel and the prediction error quantization value), and compares the result with a threshold to determine which quantization table is to be used. After the determination, the module transmits a control signal 016. That is, the control signal 016 transmits the following control signal.

Figure 8:
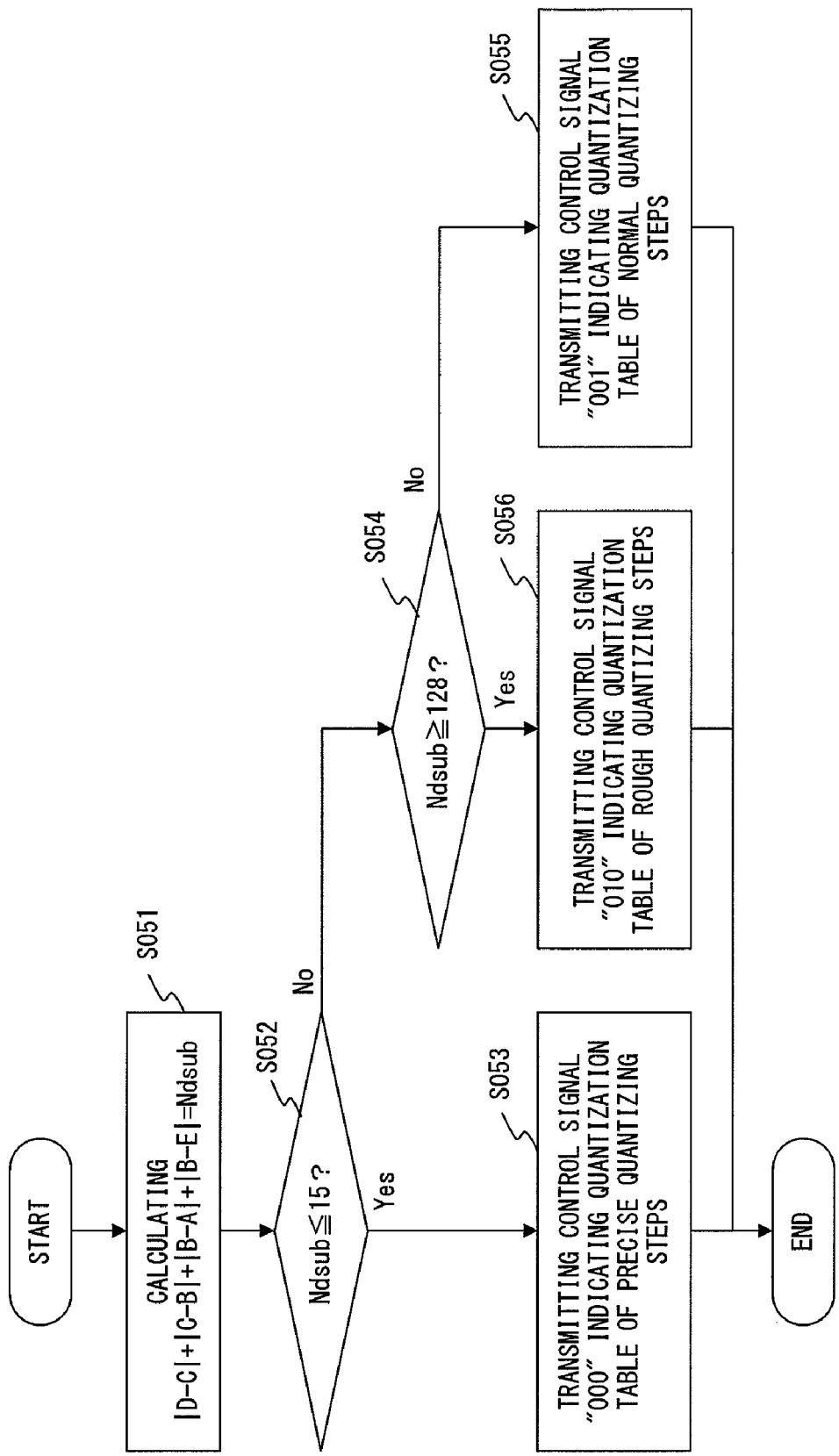
FIG. 8 is a flowchart for explanation of the operation of the peripheral level difference determination module shown in FIG. 4.

Control signal 000: transmitted when a quantization table of precise quantizing steps is used Control signal 001: transmitted when a quantization table of normal quantizing steps is used Control signal 010: transmitted when a quantization table of rough quantizing steps is used FIG. 8 is a flowchart for explanation of the operation of the peripheral level difference determination module 015 shown in FIG. 4. In step S051 shown in FIG. 8, Ndsub as a sum of the absolute values of the level difference D-C, the level difference C-B, and the level difference B-A, and the level difference B-E is calculated. In step S052, it is determined whether or not the Ndsub is 15 or less. If the Ndsub is 15 or less, control is passed to step S053. In step S053, the control signal "000" indicating the quantization table of precise quantizing steps is transmitted, thereby terminating the process. That is, in the inactive image (flat image), any image degradation can be easily detected by human eyes. Therefore, a precise quantization table is used for the inactive image to perform high precision encoding.

The value for determination of the Ndsub is 15 as a threshold in the description above, but the present invention is not limited to this value. Generally, the pixel level difference of 2 to 4 can be easily detected by human eyes. Since the sum of four absolute values of level differences is acquired in this embodiment, the total of the pixel level difference easily detected by human eyes is 8 (that is, 2×4) through 16 (that is, 4×4). Since the threshold used in the determination above is to suppress the propagation of error in an inactive image (flat image), a threshold (15 in the description above) is to be determined in the range from 8 to 16.

If the Ndsub is 16 or more, control is passed to step S054, and it is determined in step S054 whether or not the Ndsub is 128 or more. If the Ndsub is 127 or less, control is passed to step S055. In step S055, the control signal "001" indicating the quantization table of normal quantizing steps is transmitted, thereby terminating the process. If the Ndsub is 128 or more, control is passed to step S056. In step S056, the control signal "010" indicating the quantization table of rough quantizing steps is transmitted, thereby terminating the process.

That is, in a highly-active image (image having a small flat portion), some image degradation is not easily detected by human eyes. Therefore, high speed encoding can be realized by using a rough quantization table for the highly-active image.

The value for determination of the Ndsub is 128 as a threshold in the description above, but the present invention is not limited to this value. Generally, the quantizing step width in a highly-active image (image having a small flat portion) is set to 24 through 32. Therefore, the sum of four absolute values of level differences is four times the set value, that is, the range from 96 to 128. In the range, a threshold is determined (128 in the description above), and a third quantization table of rough quantizing steps and a second quantization table of normal quantizing steps can be used.

In the present embodiment, 3-bit control signals (000), (001), and (010) are associated as control signals, but any signal other than these control signals can be accepted so far as a quantization table of different quantizing steps can be specified. In addition, the quantization table is not limited to the above-mentioned quantization tables of precise, rough, or quantization table of normal quantizing steps, but four or more quantization tables can be provided, or only two types of quantization tables, that is, precise and rough tables, can be provided. In short, the quantization can be performed with two or more different types of quantization step widths.

Next, the quantization table switch module 017 outputs a control signal for switch of quantization tables according to two control signals 014 and 016 to the quantizer 003. The prediction unit 018 calculates a prediction value X' of the compressing target pixel X on the basis of the peripheral pixels A (007), B (011), and C (010).

Figure 9A:
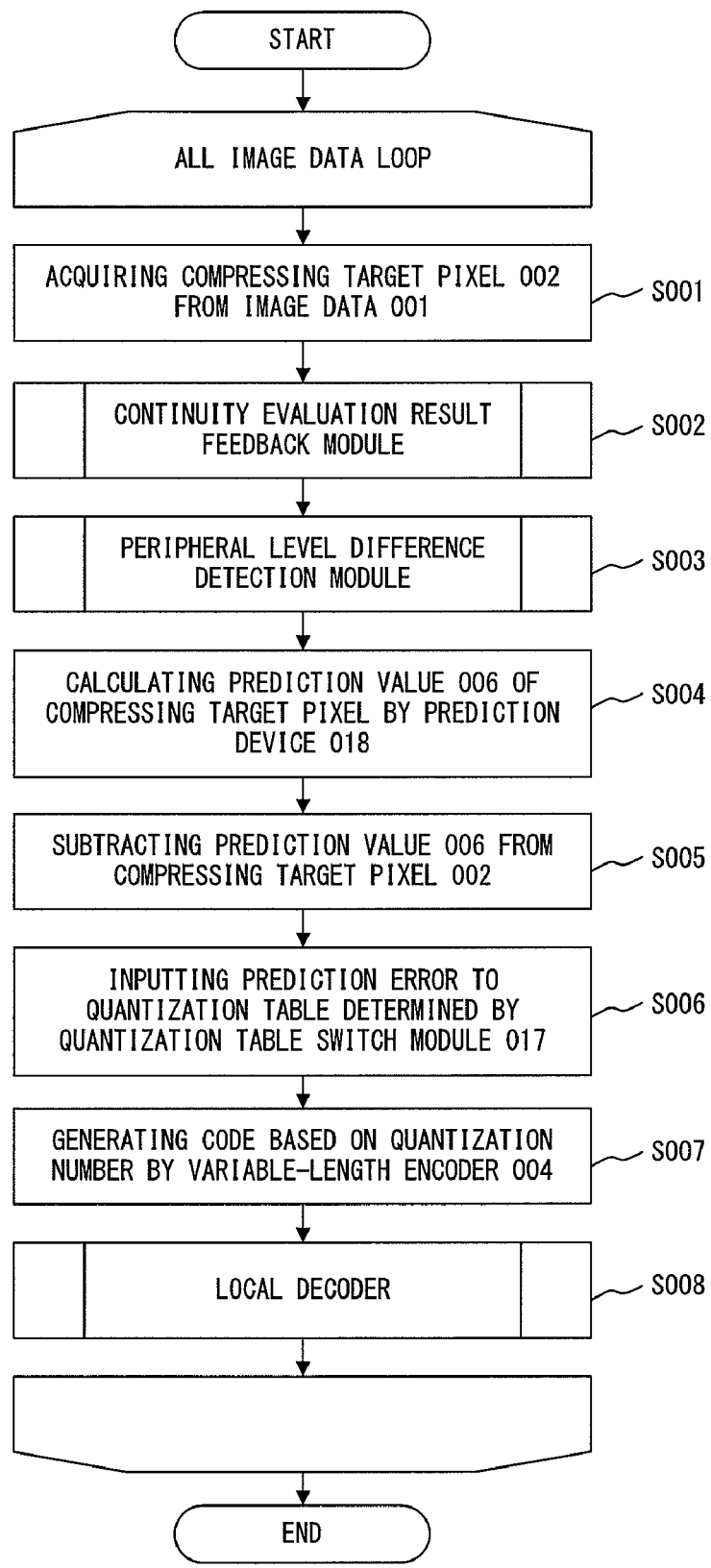
FIG. 9A is a flowchart for explanation of the operation of the image data compression (encoding) device according to an embodiment of the present invention.
Figure 9B:
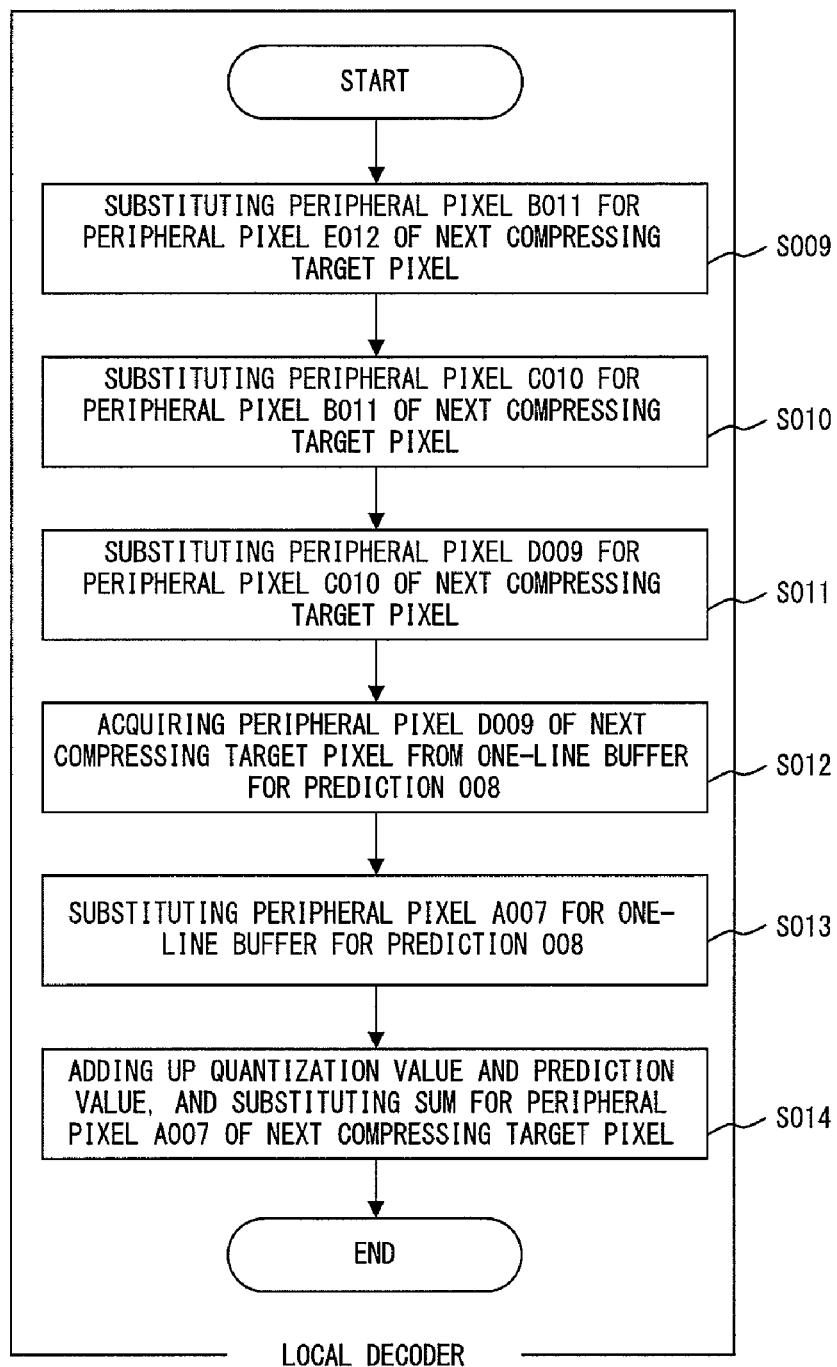
FIG. 9B is a flowchart for explanation of the process of the "local decoder" in step S008 shown in FIG. 9A.

FIG. 9A is a flowchart for explanation of the operation of the image data compression (encoding) device according to an embodiment of the present invention. FIG. 9B is a flowchart for explanation of the process of the "local decoder" in step S008 shown in FIG. 9A. In FIGS. 9A and 9B, S is short for "step".

Before describing the steps shown in FIG. 9A, it is to be noted that the process enters the loop until all image data is processed in the present embodiment.

S001: The compressing target pixel X (002) is acquired from the image data 001.

S002: The continuity evaluation result feedback module 013 measures the level difference (difference value between the sum of the prediction value corresponding to the pixel A and the prediction error quantization value and the sum of the prediction value for the pixel B and the prediction error quantization value) on the basis of the peripheral pixels A (007) and B (011), evaluates the continuity, and outputs the control signal 014 indicating the use of a precise quantization table when the same level differences continue a predetermined number of times or more to the quantization table switch module 017. Otherwise, control is passed to step S003

S003: The peripheral level difference detection module 015 detects a sum of absolute values of peripheral level differences (that is, the difference value between the peripheral pixels of the level value corresponding to each peripheral pixel), the sum of absolute values of the level differences relating to the peripheral pixels is evaluated, and a control signal 016 for determination of the quantization table is output to the quantization table switch module 017.

S004: The prediction unit 018 calculates the prediction value X' (006) of the compressing target pixel X (002).

S005: the prediction value X' (006) is subtracted from the compressing target pixel X (002).

S006: A prediction error is input to the quantization table determined by the quantization table switch module 017 to calculate a prediction error quantization value (refer to FIGS. 6A through 6C).

S007: The variable-length encoder 004 generates a code on the basis of a quantization number. The code can be a Golomb code, or an arithmetic code.

S008: To compress the next pixel, the peripheral pixels A (007), B (011), C (010), and the line buffer for prediction 008 are updated.

S009: The peripheral pixel B (011) is substituted for the peripheral pixel E (012) of the compressing target pixel.

S010: The peripheral pixel C (010) is substituted for the peripheral pixel B (011) of the compressing target pixel.

S011: The peripheral pixel D (009) is substituted for the peripheral pixel C (010) of the compressing target pixel.

S012: The peripheral pixel D (009) of the next compressing target pixel is acquired from the one-line buffer for prediction 008.

S013: The peripheral pixel A (007) is substituted for the one-line buffer 008 for prediction S014: The quantization value (that is, the prediction error quantization value for the compressed pixel X (002) calculated in S006) and the prediction value X' (006) are added up, and the sum is substituted for the peripheral pixel A (007) of the next compressing target pixel.

Figure 10:
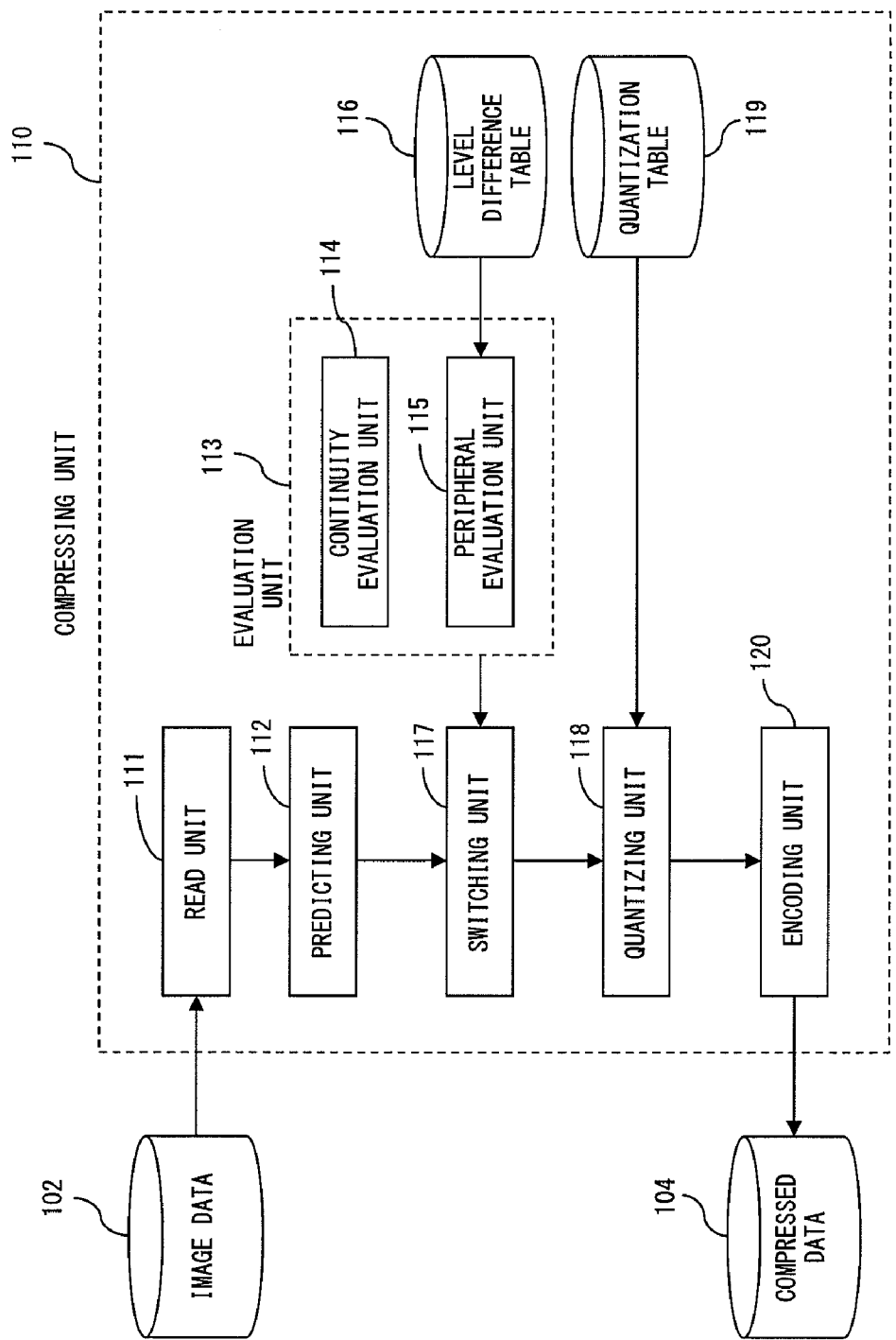
FIG. 10 is a functional block diagram showing the configuration of the system of the image data compression device according to an embodiment of the present invention.

FIG. 10 is a block diagram showing the configuration of the system when the compression device of the image data according to an embodiment of the present invention is read by a computer, and represents a block diagram showing the functions of the contents described above. In FIG. 10, the image data compression device according to an embodiment of the present invention first inputs image data 102 to be compressed to a compressing unit 110, the compressing unit 110 first reads each line of the image data 102 by read unit 111, extracts a pixel to be compressed, and inputs the extracted compressing target pixel to a predicting unit 112.

The predicting unit 112 calculates a prediction error by subtracting the prediction value of the pixel to be compressed that has been predicted by a prediction device from the value of the pixel to be compressed, a continuity evaluation unit 114 of a evaluation unit 113 corresponding to the continuity evaluation result feedback module 013 shown in FIG. 4 evaluates whether or not the level difference between the two specific peripheral pixel relating to the compressing target pixel continue. If the same level differences continue a predetermined number of times or more, a control signal for a use of a precise quantization table 119 as shown in FIG. 6A is generated. In addition, a peripheral evaluation unit 115 of the evaluation unit 113 corresponding to the peripheral level difference detection module 015 shown in FIG. 4 detects a sum of the absolute values of the level differences of two peripheral pixels of the pixel for which a prediction value of the compressing target pixel is calculated, refers to a level difference table 116 for management after associating the level difference with the information about a quantization table to be used, evaluates the sum of the absolute values of the peripheral pixel level differences, and inputs a control signal indicating which quantization table 119 is to be used to a switching unit 117.

The switching unit 117 corresponding to the quantization table switch module 017 instructs a quantizing unit 118 to switch the quantization table 119 according to the input control signal. The quantizing unit 118 switches the quantization table 119, that is, the quantization table 119 as a reference destination is changed, calculates a prediction error quantization value using the switched quantization table 119, and inputs the calculation result as the output of the quantizing unit 118 to an encoding unit 120 corresponding to the variable-length encoder 004. The encoding unit 120 generates a compression code on the basis of the input prediction error quantization value, accumulates the generated compression code as the output of the compressing unit 110, and obtains compressed data 104.

It is obvious that the process by the image data compression device shown in FIG. 10 can be realized by a computer using a program written and read. In this case, the hardware resources of the computer can be various registers, arithmetic units including an ALU, RAM, ROM, I/O, etc. although not shown in the attached drawings. The above-mentioned modules, prediction device, quantizers including a quantization table, encoder, etc. can be incorporated into one unit as a chip of LSI and can be used as an image data compression device in various applications.

Thus, according to the image compression device of the present invention, using a buffer for prediction for holding one line of quantized pixel level values (that is, a sum of the prediction value corresponding to each pixel and the prediction error quantization value), each pixel is quantized and coded, and each pixel is evaluated as to whether or not image degradation has occurred in the quantizing process, and the result is immediately fed back (switching quantization tables) in quantizing and encoding the next pixel. If image degradation has occurred by quantization error, a quantizing process is performed by switching a quantization table to a quantization table of precise quantizing steps, thereby solving (or suppressing) the problem of the quantization error and immediately (in several pixel units) correcting the image degradation if it has occurred.

If the quantization error has occurred, there is the possibility that the same level differences have occurred in quantizing steps among lines. Therefore, if it is determined after the evaluation of the continuity of the same values of the level differences that the quantization error has propagated, the quantization table is switched to perform precise quantization, thereby preventing the propagation of prediction error that causes a line (horizontal line in the image) which does not originally exist in an image, but occurs (as a horizontal line) at the vicinity of an edge.

In a natural image such as the movies recorded on a DVD, the image degradation in a flat image (human skin etc.) that indicates small fluctuations in level difference can be easily detected outstandingly. On the other hand, the image degradation in a highly-active (that is, a large fluctuation in pixel value) image is not easily detected. Therefore, by calculating a sum of the absolute values of the level differences between the pixels in the preceding and the pixel in the current lines (currently to be processed), the quantizing steps can be rough or precise depending on the sum to enhance the compression efficiency with the image degradation suppressed.

In addition, according to the image compression device of the present invention, if a simple device as a counter can detect whether or not the same level differences continuously occur in a specific pixel, and a quantization table for precise quantization can be selected when the same level differences occur a predetermined number of times or more, for example, continuously four times, then the image degradation to be caused in the direction of long lines can be corrected before it occurs (becomes large image degradation that can be detected by human eyes).

According to the image compression device of the present invention, a sum of the absolute values of the peripheral pixel level differences of the compressing target pixel is calculated using a prediction buffer for holding 1 line of pixel level values. On the basis of the calculation result, a control signal indicating which quantization table is to be used is transmitted to a quantization table switching module. Therefore, feedback can be immediately applied to the quantizer on the basis of the activity level (sum of the absolute values of the peripheral pixel level difference) around the compressing target pixel.

Furthermore, according to the image compression device, a control signal for switch a quantization table is used in switching quantization tables. Therefore, depending on the continuity of the level difference and the activity level around the compressing target pixel, three types of quantization tables having different levels of quantization, that is, a precise quantization table, a normal quantization table, and a rough quantization table, can be selectively used. Furthermore, it is obvious that, when more precise control is to be performed, three or more types of quantization tables can be selectively used for the same effect.

The image compression device processes image data passing as a stream in a frame unit when an image to be processed is a progressive image, and in the order from top to bottom of the screen in a field unit when the image to be processed is a interlace image. A predetermined size of the compressed data after compression encoding is put in a packet and transferred out of the present device in accordance with the transmission rules of a transmission line to which the present device is connected.

Figure 11:
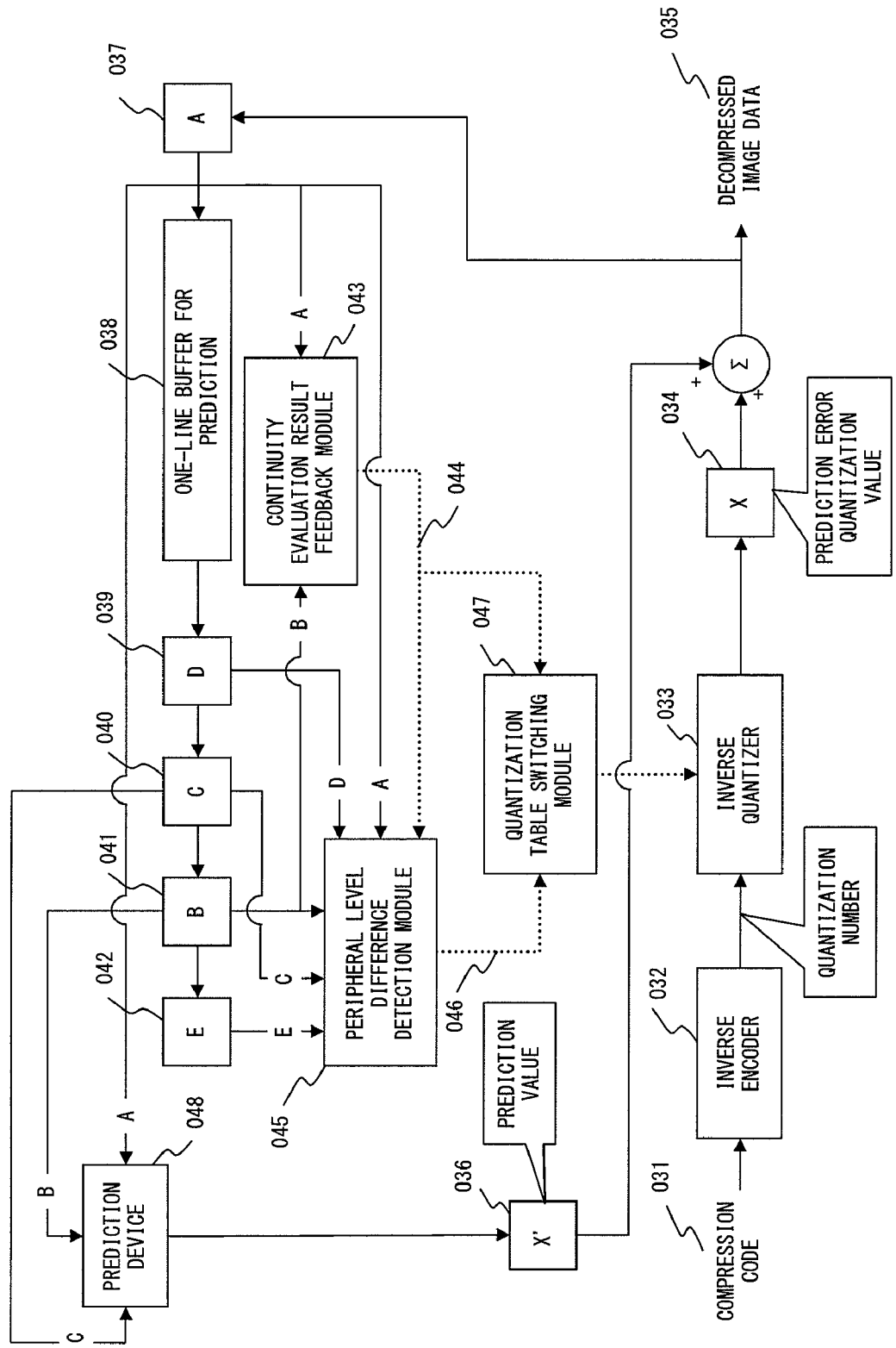
FIG. 11 is a block diagram showing the configuration of the image data decompression (decoding) device according to an embodiment of the present invention.

FIG. 11 is a block diagram showing the configuration of the image data decompression (decoding) device according to an embodiment of the present invention. In FIG. 11, a compression code 031 refers to a compression code of image data variable-length encoded as shown in FIG. 4. Then, an inverse encoder 032 receives a compressed code of the variable-length encoded image data, and outputs a quantization number corresponding to the code. An inverse quantizer 033 receives the quantization number and outputs a prediction error quantization value X (034).

FIG. 12A is an inverse quantization table showing the correspondence between the quantization number assigned to the inverse quantizer 033 and the prediction error quantization value, and is a first inverse quantization table having precise quantizing steps. FIG. 12B is an inverse quantization table showing the correspondence between the quantization number assigned to the inverse quantizer 033 and the prediction error quantization value, and is a second inverse quantization table having normal quantizing steps (quantizing step wider than the step of the first inverse quantization table). FIG. 12C is an inverse quantization table showing the correspondence between the quantization number assigned to the inverse quantizer 033 and the prediction error quantization value, and is a third inverse quantization table having rough quantizing steps (wider quantizing step than the step of the second inverse quantization table). The correspondence between the prediction error quantization values and the quantization numbers shown in FIGS. 12A, 12B, and 12C is to be consistent between the decompressing side and the compressing side. Therefore, the quantization tables (FIGS. 6A, 6B, and 6C) showing the correspondence between the prediction error quantization values and the quantization numbers are provided on the compressing side corresponding to FIGS. 12A, 12B, and 12C. In the descriptions above, three examples of inverse-quantizer are shown, but the present invention is not limited to three types, but two or more types of inverse quantization tables having different quantizing steps can be effective as described above on the compressing side.

When the image format refers to an interlace image or a progressive image, the arrangement between the decompressing target pixel X and the peripheral pixel (between the lines and the preceding pixel) is the same as the arrangement between the compressing target pixel and the peripheral pixel (between the lines and the preceding pixel) shown in FIG. 5. However, the pixel to be compressed shown in FIG. 5 is replaced with the pixel to be decompressed.

The prediction error quantization value X (034) is added to a prediction value X' (036) calculated by a prediction device 048 to obtain a decompressed image data 035, and can be a peripheral pixel A (037) of the next decompressing target pixel.

The peripheral pixel A (037) stores a pixel left to the decompressing target pixel as the peripheral pixel A shown in FIG. 5 (that is, a sum of the prediction value for the pixel as a value corresponding to the pixel processed immediately before on the same line as the pixel X and the prediction error quantization value as the value obtained by quantizing the difference (prediction error) between the pixel value and the prediction value. A one-line buffer for prediction 038 is configured by a buffer, for example, a shift register, for holding about one line for a quantization result (that is, a sum of the prediction value as a value corresponding to each pixel and the prediction error quantization value) for prediction. As the peripheral pixels D, C, B, and E shown in FIG. 5, a peripheral pixel D (039) stores a sum of the prediction value for the pixel diagonally right above (in the preceding line) the decompressing target pixel and the prediction error quantization value. A peripheral pixel C (040) stores a sum of the prediction value for the pixel located above (in the preceding line) the decompressing target pixel and the prediction error quantization value. A peripheral pixel B (041) stores a sum of the prediction value for the pixel located diagonally left above (in the preceding line) the decompressing target pixel and the prediction error quantization value. A peripheral pixel E (042) stores a sum of the prediction value for the pixel located left to the peripheral pixel B (041) in the preceding line and the prediction error quantization value.

A continuity evaluation result feedback module 043 measures the level difference (difference value between A (037) and B (041)) on the basis of the value stored in the peripheral pixels A (037) and B (041), evaluates the continuity of the difference value, and outputs a control signal 044 to use a precise inverse quantization table (a first inverse quantization table shown in FIG. 12A) when the same level differences continue a predetermined number of times or more.

In this process as in the compressing process, relating to the frequency for the determination of the continuity, the size lower than the image size is preferable because a switch to a precise inverse quantization table is desired before image degradation is conspicuous. For example, in an image having 720 pixels in the horizontal direction, horizontal linear image degradation having a length of 6 pixels can be easily detected by human eyes. Therefore, it is desired to set a smaller value. In the present embodiment, four pixel process is performed.

Figure 13:
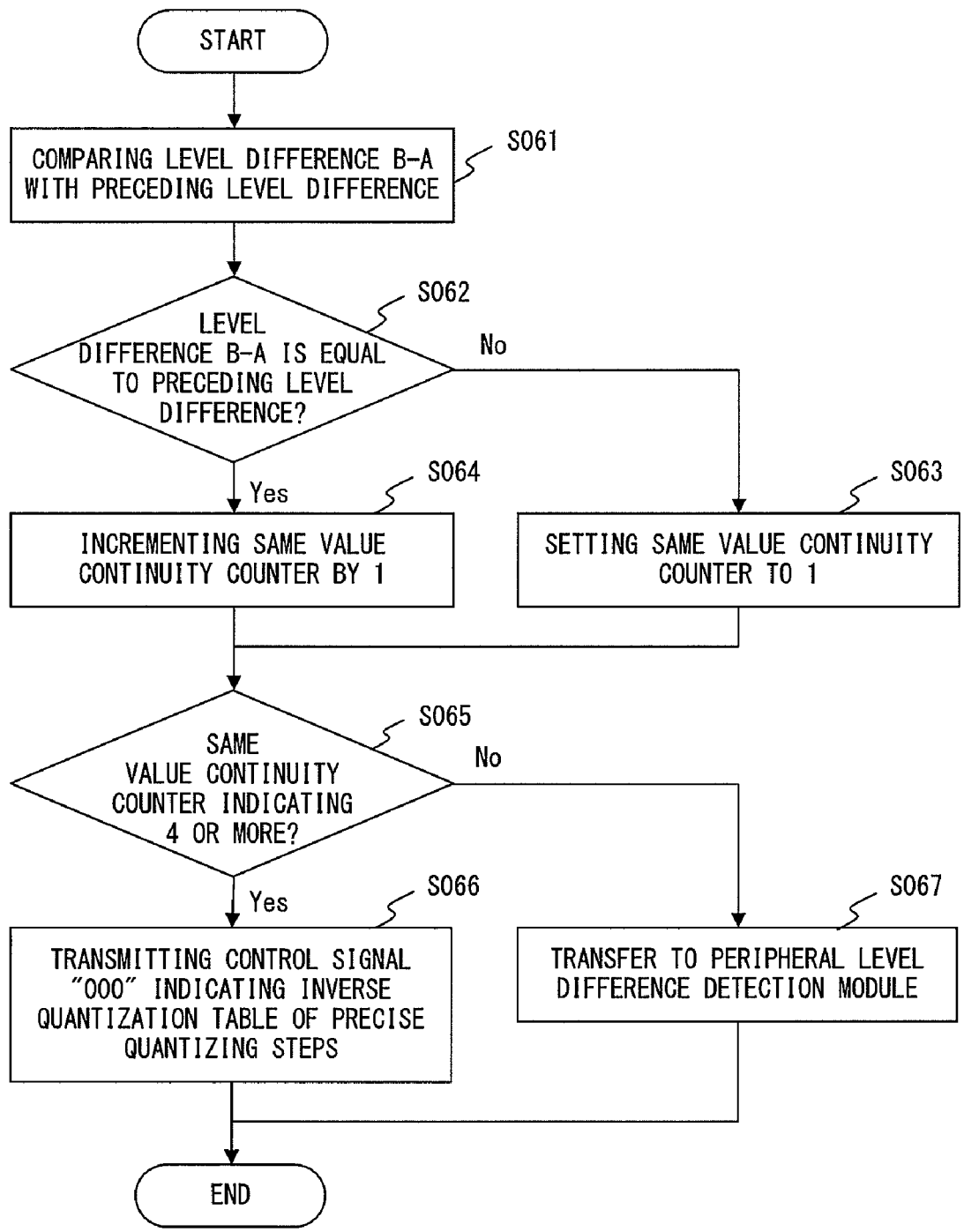
FIG. 13 is a flowchart for explanation of the operation of the continuity evaluation result feedback module shown in FIG. 11.

FIG. 13 is a flowchart of the operation of the continuity evaluation result feedback module 043 shown in FIG. 11. The process shown in FIG. 13 is the same in contents as the process shown in FIG. 7. In step S061 shown in FIG. 13, the level difference B–A is compared with the preceding level difference (that is, the level difference corresponds to the level difference B–A in the preceding process. Therefore, in the current process, it corresponds to the level difference between the E and the pixel to the left of the pixel A). In step S062, it is determined whether or not the level difference B–A is equal to the preceding level difference. If they are not equal to each other, the same value continuity counter is set to 1 in step S063, and control is passed to step S065. If they are equal to each other, control is passed to step S064, and the same value continuity counter is incremented by 1 in step S064. In step S065, it is determined whether or not the counter value of the same value continuity counter is 4 or more. If the counter value is 4 or more, control is passed to step S066. In step S066, the control signal "000" indicating the inverse quantization table of precise quantizing steps is transmitted, thereby terminating the process. In addition, if the counter value is less than 4, control is passed to step S067. In step S067, control is passed to a peripheral level difference detection module 045, thereby terminating the process.

As described above, the control signal 044 indicates the control signal "000" referring to precise quantizing steps, or a control signal referring to the operation of the peripheral level difference detection module 045.

The peripheral level difference detection module 045 calculates a sum of the absolute values of the peripheral pixel level differences (difference value of the sum (=level value) of the prediction value corresponding to each pixel and the prediction error quantization value), and compares the result with a threshold to determine which inverse quantization table is to be used. After the determination, the module transmits a control signal 046. That is, the control signal 046 transmits the following control signal.

Figure 14:
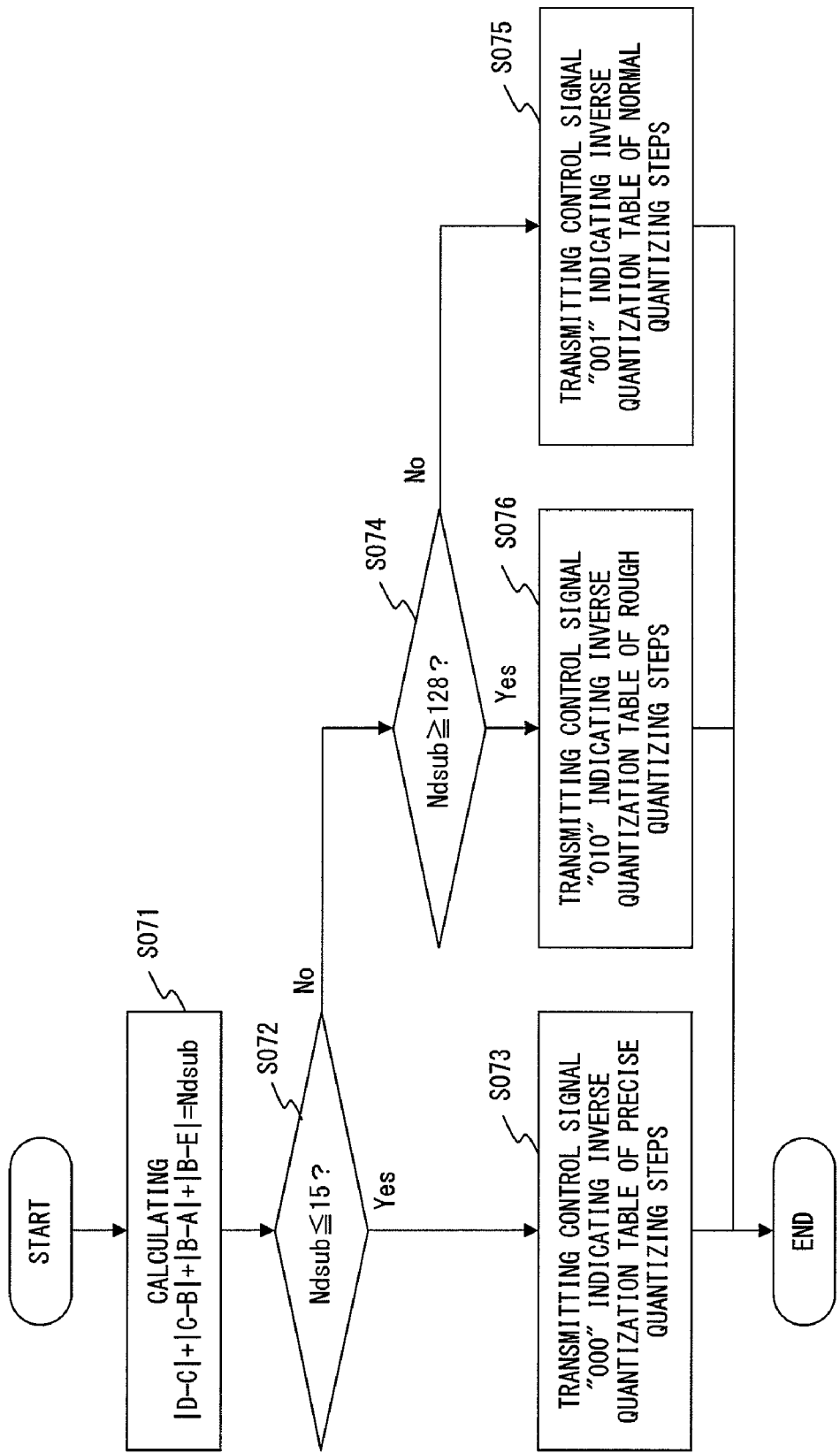
FIG. 14 is a flowchart for explanation of the operation of the peripheral level difference determination module shown in FIG. 11.

Control signal 000: transmitted when an inverse quantization table of precise quantizing steps is used Control signal 001: transmitted when an inverse quantization table of normal quantizing steps is used Control signal 010: transmitted when an inverse quantization table of rough quantizing steps is used FIG. 14 is a flowchart for explanation of the operation of the peripheral level difference determination module 045 shown in FIG. 11. The process in FIG. 14 is the same in contents as the process shown in FIG. 8 as the process on the compressing side. In step S071 shown in FIG. 14, Ndsub as a sum of the absolute values of the level difference D–C, the level difference C–B, and the level difference B–A, and the level difference B–E is calculated. In step S072, it is determined whether or not the Ndsub is 15 or less. If the Ndsub is 15 or less, control is passed to step S073. In step S073, the control signal "000" indicating the inverse quantization table of precise quantizing steps is transmitted, thereby terminating the process.

If the Ndsub is 16 or more, control is passed to step S074, and it is determined in step S074 whether or not the Ndsub is 128 or more. If the Ndsub is 127 or less, control is passed to step S075. In step S075, the control signal "001" indicating the inverse quantization table of normal quantizing steps is transmitted, thereby terminating the process. If the Ndsub is 128 or more, control is passed to step S076. In step S076, the control signal "010" indicating the inverse quantization table of rough quantizing steps is transmitted, thereby terminating the process. The value of the threshold for determination of the Ndsub is not limited to 15 or 128, or a value in a desired range is similarly determination as in the compressing process described above. It is obvious that the threshold for determination of the Ndsub is to be the same in the compressing process and the decompressing process.

In the present embodiment, 3-bit control signals (000), (001), and (010) are associated as control signals, but any signal other than these control signals can be accepted so far as an inverse quantization table of different quantizing steps can be specified. In addition, the inverse quantization table is not limited to the above-mentioned inverse quantization tables of precise, rough, or inverse quantization table of normal quantizing steps, but four or more inverse quantization tables can be provided, or only two types of inverse quantization tables, that is, precise and rough inverse tables, can be provided. In short, inverse quantization in two or more types of inverse quantization step widths can be performed in the quantizing process to be performed on the image data compression device side.

Next, the quantization table switch module 047 outputs a control signal for switch of inverse quantization tables according to two control signals 044 and 046 to the inverse quantizer 033. The prediction device 048 calculates a prediction value X' of the decompressing target pixel X on the basis of the peripheral pixels A (037), B (041), and C (040).

Figure 15A:
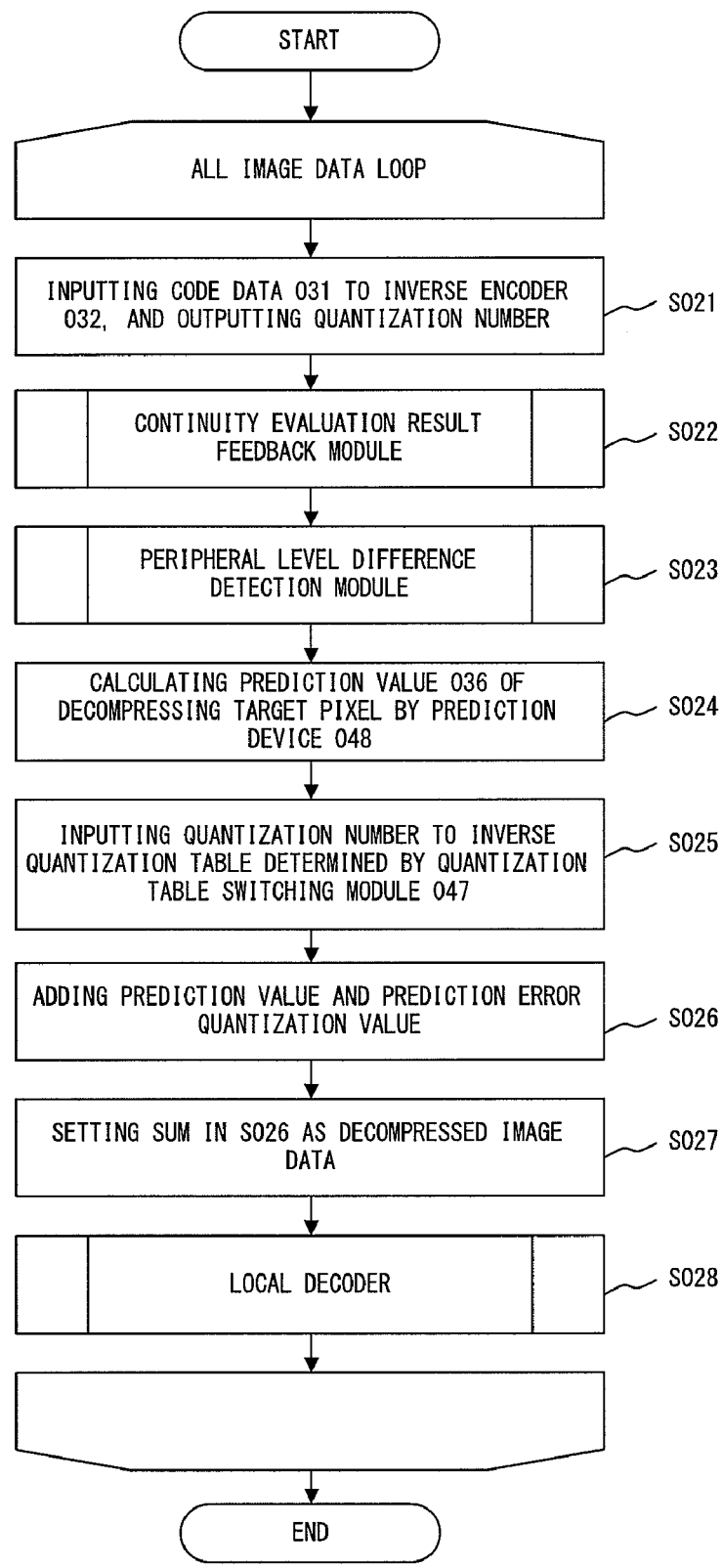
FIG. 15A is a flowchart for explanation of the operation of the image data decompression (decoding) device according to an embodiment of the present invention.
Figure 15B:
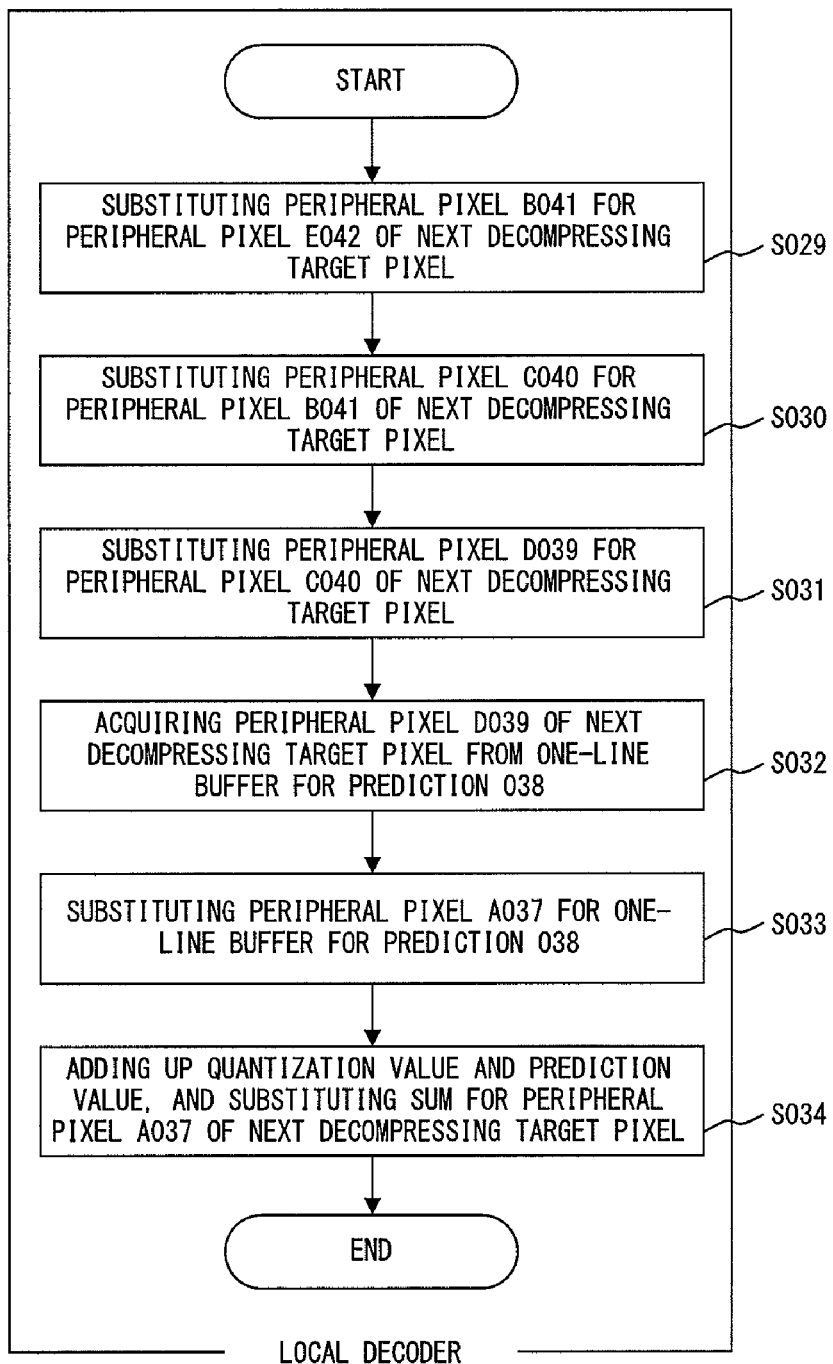
FIG. 15B is a flowchart for explanation of the process of the "local decoder" in step S028 shown in FIG. 15A.

FIG. 15A is a flowchart for explanation of the operation of the image data decompression (decoding) device according to an embodiment of the present invention. FIG. 15B is a flowchart for explanation of the process of the "local decoder" in step S028 shown in FIG. 15A. In FIGS. 15A and 15B, S is short for "step". The processes in FIGS. 15A and 15B are the same in contents as the processes in FIGS. 9A and 9B Before describing the steps shown in FIG. 15A, it is to be noted that the process enters the loop until all image data is processed in the present embodiment.

S021: The compression code 031 is input to the inverse encoder 032 to output a quantization number.

S022: The continuity evaluation result feedback module 043 measures the level difference (that is, the difference value between the sum of the prediction value corresponding to the pixel A and the prediction error quantization value and the sum of the prediction value for the pixel B and the prediction error quantization value) on the basis of the peripheral pixels A (037) and B (041), evaluates the continuity, and outputs the control signal 044 indicating the use of a precise inverse quantization table to the quantization table switch module 047 when the same level differences continue a predetermined number of times or more. Otherwise, control is passed to step S023.

S023: The peripheral level difference detection module 045 detects a sum of absolute values of peripheral level differences (that is, the difference value between the peripheral pixels of the level value corresponding to each peripheral pixel), the sum of absolute values of the level differences for a peripheral pixel is evaluated, and a control signal 046 for determination of the inverse quantization table to the quantization table switch module 047.

S024: The prediction device 048 calculates the prediction value X' of the decompressing target pixel X.

S025: A quantization number is input to the inverse quantization table determined by the quantization table switching module 047, and a prediction error quantization value is calculated.

S026: The prediction value is added to the prediction error quantization value.

S027: The sum in S026 is set as decompressed image data.

S028: To decompress the next pixel, the peripheral pixels A (037), B (040), C (040), and the buffer for prediction 038 are updated (local decoder).

S029: The peripheral pixel B (041) is substituted for the peripheral pixel E (042) of the decompressing target pixel.

S030: The peripheral pixel C (040) is substituted for the peripheral pixel B (041) of the decompressing target pixel.

S031: The peripheral pixel B (039) is substituted for the peripheral pixel C (040) of the decompressing target pixel.

S032: The peripheral pixel D (039) of the next decompressing target pixel is acquired from the one-line buffer for prediction 038.

S033: The peripheral pixel A (037) is substituted for the one-line buffer for prediction 038.

S034: The prediction error quantization value calculated in S026 and the prediction value are added up, and the sum is substituted for the peripheral pixel A (037) of the next decompressing target pixel.

Figure 16:
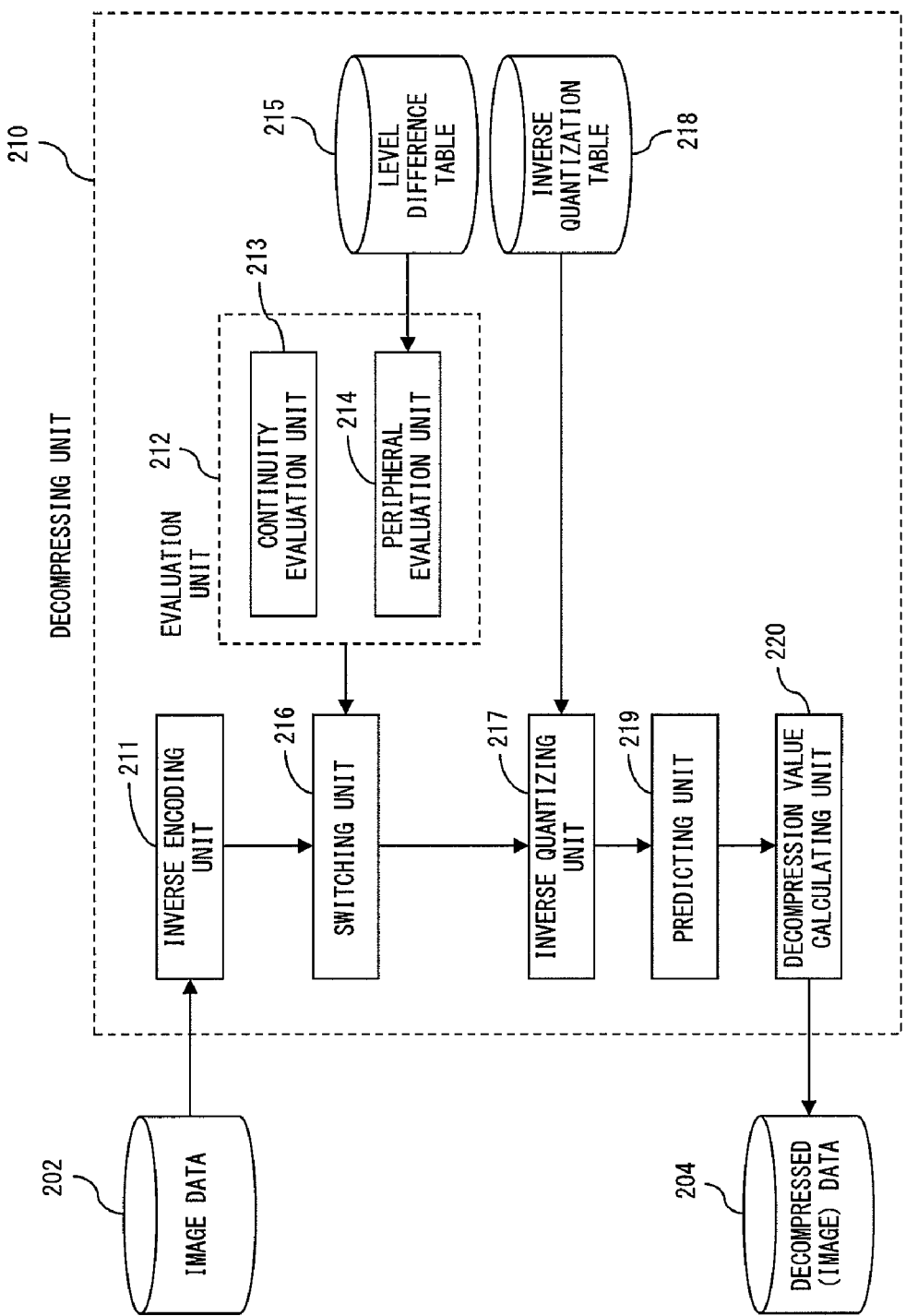
FIG. 16 is a functional block diagram showing the configuration of the system of the image data decompression device according to an embodiment of the present invention.

FIG. 16 is a block diagram showing the configuration of the system in which the decompression device of the image data decompression device according to an embodiment of the present invention is read by a computer, and represents the functions of the contents described above. In FIG. 16, the image data decompression device according to an embodiment of the present invention inputs compressing data 202 as the output of the image data compression device to the decompressing unit 210. The decompressing unit 210 first inputs the image data 202 to an inverse encoding unit 211 corresponding to the inverse encoder 032 shown in FIG. 11, obtains a quantization number from the inverse encoding unit 211, and inputs the quantization number to the inverse quantizing unit 212 corresponding to the inverse quantizer 033.

A continuity evaluation unit 213 corresponding to the continuity evaluation result feedback module 043 shown in FIG. 11 in the evaluation unit 212 evaluates whether or not the level difference of two specific peripheral pixels relating to the decompressing target pixel continuously appears. If the same level differences continues a predetermined number of times, a control signal for use of a precise inverse quantization table 218 is generated. In addition, a peripheral evaluation unit 214 corresponding to the peripheral level difference detection module 045 of the environment unit 212 detects a sum of the absolute values of the level differences of two peripheral pixels including the peripheral pixels of the pixel for which a prediction value of a decompressing target pixel is calculated, refers to a level difference table 215 for management by association between the level difference and the information about the quantization table to be used, evaluates the sum of the absolute values of the peripheral pixel level differences, and inputs the control signal indicating what level of the inverse quantization table 218 is to be used to a switching unit 216.

The switching unit 216 corresponding to the quantization table switch module 047 instructs an inverse quantizing unit 217 to switch the inverse quantization table 218 according to the input control signal. The inverse quantizing unit 217 switches the inverse quantization table 218, that is, changes the inverse quantization table 218 as a reference destination, calculates a prediction error quantization value using the switched quantization table 218, and inputs the calculation result to a predicting unit 219. The predicting unit 219 adds up the prediction value of the decompressing target pixel predicted by the prediction device and the prediction error quantization value calculated using the switched inverse quantization table 218 to observe a decompressed pixel value, accumulates the value, and obtain decompressed (image) data 204.

It is obvious that the process by the image data decompression device shown in FIG. 16 can be realized by a computer by describing the process as a program and reading. In this case, the hardware resources of the computer can be various registers, arithmetic units including an ALU, RAM, ROM, I/O, etc. although not shown in the attached drawings. The above-mentioned modules, prediction device, inverse quantizers including an inverse quantization table, inverse encoder, etc. can be incorporated into one unit as a chip of LSI and can be used as an image data decompression device in various applications as the decompressing process for processing two types of image data having different characteristics.

As described above, image data can be decompressed by switching an inverse quantization table on the decompressing side as well as the compressing side.

The image data compression device and the image data decompression device according to the present invention can be read as one-chip LSI to be loaded into a desired application equipment, and can be applied to, for example, a car-mounted video data transmission system including a car navigation system, various amusement (game, animation, etc.) equipment. For example, in a car-mounted video data transmission system, a display is provided on the rear side to supply video different from the front side. Therefore, the image data processed by the video data processing device implemented on the front side can be compressed and transmitted to the rear side. On the rear side, the transmitted image data is decompressed and displayed. When image data is relayed, the compressing and decompressing processes are repeated at each relay point.

What is claimed is:

1. An image compression device having a prediction unit for predicting a value of a compressing target pixel from peripheral values relative to the compressing target pixel, and quantizing prediction error between a prediction value of the prediction unit and a value of an actual pixel in a predetermined quantizing step, comprising:

a specific pixel level difference evaluation unit sequentially calculating a difference value between level values as a sum of the prediction values corresponding to each of the compressed pixel immediately before the compressing target pixel and peripheral compressed pixels adjacent to the pixel and a quantization value of the prediction error, and evaluating the sameness of the difference value; and a quantization switching unit controlling the quantization in the quantizing step more precise than the quantizing step used when the difference value continuously indicates the same value as a result of the evaluation by the specific pixel level difference evaluation unit.

2. The image compression device according to claim 1, further comprising a buffer holding at least one line of the level value for each pixel, wherein the specific pixel level difference evaluation unit obtains from the buffer the level value for a first pixel as a compressed pixel preceding on a same line as the compressing target pixel and the level value for a second pixel in a same column position as the first pixel on the line immediately after the line in which the compressing process is performed, and evaluates sameness of the difference values between the level values.

3. The image compression device according to claim 2, further comprising an absolute value sum evaluation unit obtaining from the buffer a level values of the first pixel and a plurality of pixels adjacent to the compressing target pixel on the line on which compressing process is performed preceding the line of the compressing target pixel when it is determined as a result of an evaluation by the specific pixel level difference evaluation unit that the difference value does not continue as a same value a predetermined number of times or more, calculating a total sum of absolute values of differences of level values between the pixels, and comparing the total sum and the threshold, wherein the quantization switching unit performs control by making a quantizing step smaller than a quantizing step used when the total sum is smaller than the threshold as a result of comparison by the absolute value sum evaluation unit and making a quantizing step larger than a quantizing step used when the total sum is larger than the threshold.

4. The image compression device according to claim 1, further comprising a buffer holding at least one line of the level value for each pixel, wherein the specific pixel level difference evaluation device is electrically connected to the buffer to obtain from the buffer the level value for a first pixel as a compressed pixel preceding on a same line as the compressing target pixel and the level value for a second pixel in a same column position as the first pixel on the line immediately after the line in which the compressing process is performed, and evaluates sameness of the difference values between the level values.

5. The image compression device according to claim 4, further comprising an absolute value sum evaluation unit obtaining from the buffer a level values of the first pixel and a plurality of pixels adjacent to the compressing target pixel on the line on which compressing process is performed preceding the line of the compressing target pixel when it is determined as a result of an evaluation by the specific pixel level difference evaluation unit that the difference value does not continue as a same value a predetermined number of times or more, calculating a total sum of absolute values of differences of level values between the pixels, and comparing the total sum and the threshold, wherein the absolute value sum evaluation unit outputs an instruction signal to switch the quantization table so as to make the quantizing step smaller when the total sum is smaller than a threshold as a result of evaluation, and make the quantizing step larger when the total sum is larger than the threshold.

6. An image compression device comprising a prediction unit for predicting a value of a decompressing target pixel from a value for peripheral values relative to the decompressing target pixel, and a quantizer for quantizing a prediction error calculated from the prediction value calculated by the prediction unit and an actual pixel value, wherein the quantizer comprises a plurality of quantization tables for quantizing the prediction error in different quantizing steps, wherein the image compression device comprises:

a quantization table switching unit for outputting a control signal for switch of the quantization table to the quantizer; and a specific pixel level difference evaluation unit sequentially calculating a difference value between level values as a sum of the prediction value corresponding to each of the compressed pixel immediately before the compressing target pixel and peripheral compressed pixels adjacent to the pixel and a quantization value of the prediction error, and evaluating sameness of the difference value, wherein the specific pixel level difference evaluation unit outputs a instruction signal to switch a quantization table to perform quantization in a smaller quantizing step to the quantization table switching unit when the device detects the same difference value continuously.

7. The image compression device according to claim 6, wherein the specific pixel level difference evaluation unit further comprises a counter for counting continuous occurrence of the same difference value.

8. A computer-readable storage medium on which is recorded a program, which is used to operate an image compression device having a prediction unit for predicting a value of a compressing target pixel from peripheral values relative to the compressing target pixel, and quantizing prediction error between a prediction value of the prediction unit and a value of an actual pixel in a predetermined quantizing step, used to direct the image compression device to function as:
 a specific pixel level difference evaluation unit reading from a buffer holding at least one line of a level value as a sum of the prediction value corresponding to each pixel and the prediction error quantization value the level value for a first pixel as a compressed pixel immediately before the compressing target pixel to be compressed on the same line and the level value for a second pixel in the same column position as the first pixel on the line on which a compressing process is performed immediately before the line, sequentially calculating a difference value between the level values, and evaluating sameness of the difference values; and
 a quantization switching device outputting control information to perform the quantization in a smaller step than the quantizing step used when the difference value continuously indicates the same value as a result of evaluation by the specific pixel level difference evaluation unit.

9. The computer-readable storage medium according to claim 8, wherein:
 the image compression device is further operated to function as
 an absolute value sum evaluation unit reading from the buffer level values of the first pixel and a plurality of pixels adjacent to the compressing target pixel on a line on which the compressing process is performed preceding the line of the compressing target pixel when it is determined that the difference value does not continue as the same value a predetermined number of time or more as a result of evaluation by the specific pixel level difference evaluation unit, calculating a total sum of absolute values of differences of level value s between the pixels, and comparing the total sum with the threshold; and
 the quantization switching unit outputs control information for control of the quantization so as to make a quantizing step smaller than a quantizing step used when the total sum is smaller than the threshold as a result of comparison by the absolute value sum evaluation unit, and make a quantizing step larger than the quantizing step used when the total sum is larger than the threshold.

10. An image decompression device having a prediction unit for predicting a value of a decompressing target pixel from peripheral values relative to the decompressing target pixel, and calculating a sum of a prediction value of the prediction unit and a prediction error quantization value obtained by inverse quantizing a quantization number calculated by an image compression device in advance in a predetermined quantizing step, comprising:
 a specific pixel level difference evaluation unit sequentially calculating the difference value between the decompression values as a sum of the prediction values corresponding to each of the decompressed pixel immediately before the decompressing target pixel and the adjacent decompressed pixels around the pixel and the quantization value of the prediction error, and evaluating the sameness of the difference value; and
 a quantization switching unit controlling the inverse quantization in the quantizing step more precise than the quantizing step used when the difference value continuously indicates the same value as a result of the evaluation by the specific pixel level difference evaluation unit.

11. The image decompression device according to claim 10, further comprising
 a buffer holding at least one line of the decompression value for each pixel, wherein
 the specific pixel level difference evaluation unit obtains from the buffer the decompression value for a first pixel as a decompressed pixel preceding on a same line as the decompressing target pixel and the level value for a second pixel in a same column position as the first pixel on the line immediately after the line in which the decompressing process is performed, and evaluates sameness of the difference values between the decompression values.

12. The image decompression device according to claim 11, further comprising
 an absolute value sum evaluation device obtaining from the buffer a decompression values of the first pixel and a plurality of pixels adjacent to the decompressing target pixel on the line on which decompressing process is performed preceding the line of the decompressing target pixel when it is determined as a result of an evaluation by the specific pixel level difference evaluation device that the difference value does not continue as a same value a predetermined number of times or more, calculating a total sum of absolute values of differences of decompression values between the pixels, and comparing the total sum and the threshold, wherein
 the quantization switching unit performs control by making a quantizing step smaller than a quantizing step used when the total sum is smaller than the threshold as a result of comparison by the absolute value sum evaluation unit and making a quantizing step larger than a quantizing step used when the total sum is larger than the threshold.

13. An image decompression device comprising a prediction unit for predicting a value of a decompressing target pixel from for peripheral values relative to the decompressing target pixel, and an inverse quantizer for inverse quantizing a prediction value calculated by the prediction device and a quantization number calculated in advance by the image compression device and calculating a prediction error quantization value, wherein
 the inverse quantizer comprises a plurality of inverse quantization tables for inverse quantization in different quantizing steps, wherein
 the image decompression device comprising:
 a quantization table switching unit for outputting a control signal for switch of the inverse quantization table to the inverse quantizer; and
 a specific pixel level difference evaluation unit sequentially calculating a difference value between the decompression values as a sum of the prediction value corresponding to each of decompressed pixel immediately before the decompressing target pixel and peripheral decompressed pixels adjacent to the pixel and a quantization value of the prediction error, and evaluating sameness of the difference value, wherein
 the specific pixel level difference evaluation unit outputs a instruction signal to switch a inverse quantization table to perform inverse quantization in a smaller quantizing step to the quantization table switching unit when the device detects the same difference value continuously.

14. The image decompression device according to claim 13, further comprising
a buffer holding at least one line of the decompression value for each pixel, wherein
the specific pixel level difference evaluation unit is electrically connected to the buffer to obtain from the buffer the level value for a first pixel as a decompressed pixel preceding on a same line as the decompressing target pixel and the decompression value for a second pixel in a same column position as the first pixel on the line immediately after the line in which the decompressing process is performed, and evaluates sameness of the difference values between the level values.

15. The image decompression device according to claim 14, further comprising
an absolute value sum evaluation device obtaining from the buffer a decompression values of the first pixel and a plurality of pixels adjacent to the decompressing target pixel on the line on which decompressing process is performed preceding the line of the decompressing target pixel when it is determined as a result of an evaluation by the specific pixel level difference evaluation unit that the difference value does not continue as a same value a predetermined number of times or more, calculating a total sum of absolute values of differences of decompression values between the pixels, and comparing the total sum and the threshold, wherein
the absolute value sum evaluation unit outputs an instruction signal to switch the inverse quantization table so as to make the quantizing step smaller when the total sum is smaller than a threshold as a result of evaluation, and make the quantizing step larger when the total sum is larger than the threshold.

16. The image decompression device according to claim 13, wherein
the specific pixel level difference evaluation unit further comprises a counter for counting continuous occurrence of the same difference value.

17. A computer-readable storage medium on which is recorded a program, which is used to operate an image decompression device having a prediction unit for predicting a value of a decompressing target pixel from a value of peripheral decompressed pixel and calculating a sum of a prediction value of the prediction unit and a prediction error quantization value obtained by inverse quantizing a quantization number calculated in advance by an image compression device in a predetermined quantizing step, wherein
the image decompression device operates as:
a specific pixel level difference evaluation unit reading from a buffer holding at least one line of a decompression value as a sum of the prediction value corresponding to each pixel and the prediction error quantization value the decompression value for a first pixel as a decompressed pixel immediately before the decompressing target pixel on the same line and the decompression value for a second pixel in the same column position as the first pixel on the line on which a decompressing process is performed immediately before the line, sequentially calculating a difference value between the decompression values, and evaluating sameness of the difference values; and
a quantization switching unit outputting control information to perform the inverse quantization in a smaller step than the quantizing step used when the difference value continuously indicates the same value as a result of evaluation by the specific pixel level difference evaluation unit.

18. The computer-readable storage medium according to claim 17, wherein:
the image decompression device is further operated to function as
an absolute value sum evaluation unit reading from the buffer decompression values of the first pixel and a plurality of pixels adjacent to the decompressing target pixel on a line on which the decompressing process is performed on the line of the decompressing target pixel when it is determined that the difference value does not continue as the same value a predetermined number of time or more as a result of evaluation by the specific pixel level difference evaluation unit, calculating a total sum of absolute values of differences of decompression value s between the pixels, and comparing the total sum with the threshold; and
the quantization switching unit outputs control information for control of the inverse quantization so as to make a quantizing step smaller than a quantizing step used when the total sum is smaller than the threshold as a result of comparison by the absolute value sum evaluation unit, and make a quantizing step larger than the quantizing step used when the total sum is larger than the threshold.

* * * * *